(12) United States Patent
Seeley

(10) Patent No.: US 11,225,318 B1
(45) Date of Patent: Jan. 18, 2022

(54) ELECTRIC, INDUCTIVELY-ENERGIZED CONTROLLABLE-PITCH PROPELLER HUB

(71) Applicant: Brien Aven Seeley, Santa Rosa, CA (US)

(72) Inventor: Brien Aven Seeley, Santa Rosa, CA (US)

( * ) Notice: Subject to any disclaimer, the term of this patent is extended or adjusted under 35 U.S.C. 154(b) by 0 days.

(21) Appl. No.: 17/245,338

(22) Filed: Apr. 30, 2021

(51) Int. Cl.
*B64C 11/44* (2006.01)
*B64C 11/30* (2006.01)
*B64D 35/02* (2006.01)
*B64D 27/24* (2006.01)

(52) U.S. Cl.
CPC ......... *B64C 11/44* (2013.01); *B64C 11/301* (2013.01); *B64D 27/24* (2013.01); *B64D 35/02* (2013.01); *B64D 2221/00* (2013.01)

(58) Field of Classification Search
CPC ....... B64C 11/44; B64C 11/301; B64C 11/30; B64D 27/24; B64D 35/02; B64D 2221/00
See application file for complete search history.

(56) References Cited

U.S. PATENT DOCUMENTS

| | | | | |
|---|---|---|---|---|
| 2,471,953 | A * | 5/1949 | Hamilton | B64C 11/44 416/38 |
| 2,557,127 | A * | 6/1951 | Magill | B64C 27/26 416/37 |
| 6,672,835 | B1 * | 1/2004 | Hughes | B64C 11/301 416/155 |
| 9,889,925 | B2 * | 2/2018 | Rawdon | B64C 11/06 |
| 9,973,058 | B2 * | 5/2018 | Perkinson | B64C 11/44 |
| 2016/0083077 | A1 * | 3/2016 | Rawdon | B64C 11/00 416/148 |
| 2016/0233740 | A1 * | 8/2016 | Perkinson | H02K 13/003 |

* cited by examiner

*Primary Examiner* — Philip J Bonzell
(74) *Attorney, Agent, or Firm* — Invention To Patent Services; Alex Hobson

(57) ABSTRACT

An electric, inductively-energized, multi-bladed, controllable-pitch propeller hub is configured with an internal battery, electronic control unit and electric internal reversible hubmotor, when energized by a voltage inducted across an air gap into an annulus of receiver coils that is mounted onto said propeller hub and when said propeller hub is attached to and operated with complementary electrical, electronic and mechanical components that enable wireless command signals, together forming a novel and versatile device whose operation can provide near-instantaneous modulation of aircraft thrust, lift and drag by the action of said propeller hub to actuate precise and equal changes to the pitch of each propeller blade through a full range of useful pitch settings, both during rotation of said propeller hub and when said propeller hub is stationary, with an innovation including a coaxial driveshaft that facilitates the removal and installation of said propeller hub from a propmotor.

13 Claims, 7 Drawing Sheets

ELECTRIC, INDUCTIVELY-ENERGIZED CONTROLLABLE-PITCH PROPELLER HUB

FIELD OF THE INVENTION

The present invention relates to an electric inductively-energized, multi-bladed, controllable-pitch propeller hub whose internal battery, electronic control unit and electric hubmotor, when energized by a voltage inducted into an annulus of receiver coils that is mounted onto said propeller hub and when said propeller hub is attached to and operated with complementary electrical, electronic, software and mechanical components that enable wireless command signals, together comprise a novel and versatile device whose operation can provide near-instantaneous modulation of the thrust, lift and drag of propeller-driven aircraft by the action of said propeller hub to reliably actuate precise and equal changes to the pitch of each of its propeller blades through a full range of useful pitch settings, both during rotation of said propeller hub and when said propeller hub is stationary, with an innovation comprising a coaxial driveshaft that facilitates the rapid removal and installation of said propeller hub from a propmotor.

BACKGROUND

An electric aircraft movement is occurring in the 2021 timeframe in the world of aviation, and the improvements in quiet propellers, electric motors, energy storage devices, sensors, wireless communication, microprocessors and software in said movement are enabling and requiring new approaches to aircraft propulsion and control. Up to the present timeframe, aircraft have typically been challenged by the problem of how best to install a propeller hub onto a large and bulky internal combustion engine so that a low-drag streamlined engine nacelle would result. Said challenge has generally favored the use of a propeller hub with a propeller shaft extension to provide greater length between the propeller disc and said engine. Said challenge has also generally favored the use of a relatively large diameter streamlined propeller spinner. Said shaft extension and large diameter streamlined propeller spinner have better allowed said nacelle to blend the streamlines from the propeller spinner base to the larger width and height of said engine cowling. However, propeller shaft extensions entail problems including added weight, added bending moment, increased gyroscopic loads of the propeller on the driveshaft of the engine or propmotor and a vulnerability of said propeller extension to destructive resonant vibration. In contrast to said internal combustion engines, electric motors for aircraft propulsion, herein named propmotors, offer equivalent power while being typically of a much-reduced weight and diameter—small enough to be enclosed within a propeller spinner's base diameter. Electric motors typically have a cylindrical shape with their rotating shaft located at the axial center of said cylinder, which likewise allows said propmotors to be entirely enclosed inside the propeller spinner's base diameter. When so enclosed, there is no need for a propeller shaft extension to create a streamlined nacelle. Absent a propeller shaft extension, one can attach the electric propmotor's propeller mounting flange to said propeller hub's propeller mounting flange such that the external surfaces of said propmotor and said propeller hub are in close apposition, at a distance whose minimum is limited mainly by the practical need for a mechanic to be able to loosen or to tighten and secure the bolts on said propeller mounting flange. Said close apposition of said propeller hub and said propmotor is close enough to create the opportunity for inductive coupling between them, which, in turn, provides the opportunity for a transfer of electrical energy and communication of signals across an air gap between them. Said close apposition of electric propmotor and propeller hub, along with said transfer of energy and signals across an air gap, eliminates a number of the design limitations of prior propeller hubs: namely, that they required propeller shaft extensions, and were dependent upon the flow and containment of hydraulic fluid pressure to operate a piston or, alternatively, were dependent upon spinning co-axial quill shafts to operate an actuator inside said hub, or that they were dependent upon carbon brushes that rub upon metallic conductive slip rings in order to transfer electrical energy into said propeller hub. The limitations of said propeller shaft extensions are detailed above, while hydraulic fluid pressure flow, typically through metered orifices, inevitably entails limitations on the speed with which changes to propeller pitch can be actuated. The limitations of quill shafts are issues of weight, complexity, service and reliability. The limitations of carbon brushes that rub on slip rings are several and include the following: 1) that they suffer wear from friction and vibration that limits their durability, 2) that their contact connection to the slip ring can suffer arcing and sparking when forced to conduct high voltage or large amounts of energy, 3) that their contact connection is unshielded and exposed to atmospheric contamination, water, oil mist, grease, dust, etc. that can cause resistance, shorting or leakage of the electrical energy being transferred and that requires maintenance cleaning and parts replacement, 4) that the slip rings are subject to defects such as burrs, grooving, electrical erosion or run-out that impairs energy transfer and increases wear on the carbon brushes, 5) that brushes can get stuck or rattle in their brush-holder.

The emergence of electric powered aircraft in the last 15 years has led to the prospect of having aircraft whose quietness allows them, for the first time in history, to operate at a ubiquitous network of very small, inexpensive airparks that are close-in to where people live and work. Such quiet aircraft will demand extremely quiet propellers. Said quiet aircraft must also be capable of making extremely short take offs and landings and are therefore called ESTOL aircraft. In general, to make a propeller extremely quiet requires that it turn slowly. Turning slowly requires a larger diameter propeller in order to produce the same thrust as a smaller diameter propeller that turns much faster. Large diameter propellers require a large number of blades in order to be extremely quiet. Quiet ESTOL aircraft therefore are likely to have large diameter propellers that have up to as many as 10 blades. When a propeller has more than 3 blades, the required amount of power inside the hub to rapidly execute pitch changes increases in some proportion to the increase in the number of blades and to the length and weight of said blades. To provide the greater power needed for a propeller hub to simultaneously change the pitch of all those blades on a quiet ESTOL aircraft requires a means of reliably transmitting substantial electrical power into the rotating controllable-pitch propeller hub.

Another important challenge for ESTOL aircraft is a need for a capability for extreme aerial agility. Said aerial agility includes the performance of the following extraordinary maneuvers:

1) to nearly-instantaneously increase the aircraft's drag and spoil its lift so as to make a very steep final descent; and 2) to nearly-instantaneously decrease the aircraft's drag and increase lift to arrest said steep descent just prior to landing touchdown; and 3) to nearly-instantaneously increase the aircraft's thrust and lift to execute an extremely short take off; and 4) to nearly-instantaneously reverse the aircraft's thrust and spoil its lift immediately after the moment of landing touchdown in order to shorten landing distance; and 5) in emergency circumstances, such as to preserve yaw control of said aircraft in the event of loss of power on one engine or propmotor, to nearly-instantaneously minimize a propeller's drag. This latter can be accomplished by suddenly rotating the propeller's blades so that their chordlines are nearly parallel to the aircraft's direction of flight. This maneuver, which is called "feathering" the propeller, can stop rotation of the propeller and thereby greatly reduce its drag and help maintain control of the aircraft.

For ESTOL aircraft, said extraordinary maneuvers of extreme aerial agility must be performed at relatively low airspeeds at which dynamic pressure is insufficient for brisk control by conventional movable control surfaces such as ailerons, elevators, and rudders. Therefore, a powered solution is needed for aerial agility at said low dynamic pressures, and a propmotor whose propeller hub has negligible control latency can provide said powered solution.

The sustained proper operation of a controllable-pitch propeller hub is essential to safe flight. A malfunction or failure in pitch control can lead to loss of control of the aircraft, or can greatly increase its runway length requirements. Therefore, a controllable-pitch propeller hub must provide both redundancy in its control and a mechanism for either graceful degradation or a fail-safe default propeller pitch setting.

Propeller pitch must be confined to stay within its safe operational envelope in order to prevent over-speeding of the propmotor and overstressing of the propeller blades and hub. A provision for reliably constraining pitch within said envelope is needed.

Conventional propeller hubs have relied upon propeller rotation in order to enable either hydraulic or electric means of controlling propeller blade pitch. Some means of changing pitch when the propeller is not rotating is needed.

Torquemeter: To avoid overstressing of the propeller hub, propeller blades or propmotor, a means of direct measurement of the instantaneous torque being applied to said propeller hub is an important feature for a propeller.

Thrustmeter: A means of direct measurement of the instantaneous thrust being applied to said propeller hub is an important feature for said propeller hub.

Tachometer: An all-weather, day or night method of accurately determining propeller RPM to within one RPM is an important feature for any controllable-pitch propeller hub.

Pitch setting: A means of detecting the propeller blade pitch position at any time is an important feature for said propeller, and calls for a propeller blade pitch sensor.

Propeller balance: A provision for setting and maintaining the equal and axisymmetrical distribution of mass around a propeller hub's thrust axis, is an important feature for any propeller to operate with minimal vibration.

SUMMARY OF THE INVENTION

The present invention is that of an electric, inductively-energized, multi-bladed, controllable-pitch propeller hub whose internal battery, electronic control unit and electric internal reversible hubmotor, when energized by a voltage inducted across an air gap into an annulus of receiver coils that is mounted onto said propeller hub and when said propeller hub is attached to and operated with complementary electrical, electronic and mechanical components, together comprise a novel, reliable and versatile device whose operation can provide near-instantaneous modulation of aircraft thrust, lift and drag by the action of said propeller hub to actuate precise and equal changes to the pitch of each of its propeller blades through a full range of useful pitch settings, both during rotation of said propeller hub and when said propeller hub is stationary, with an innovation comprising a coaxial driveshaft that facilitates the rapid removal and installation of said propeller hub from a propmotor.

This summary requires first some definitions of key terms: To understand the purpose and operation of a controllable-pitch propeller hub, propeller pitch must first be defined. For the purposes of brevity and inclusiveness, all subsequent use of the word "propeller" herein shall also include by inference the word "rotor". By convention, propeller "pitch" is defined as the distance parallel to the propeller's thrust axis that would theoretically be traveled by a propeller blade with no through a soft solid during one 360° rotation of said propeller. When the positive distance of said pitch is large, the pitch is called "steep" and when the distance of said pitch is small, the pitch is called "flat". If the pitch is negative, meaning that one rotation would move the propeller a negative distance (i.e. backward) instead of a positive distance (i.e. forward), that condition of negative pitch is called "reverse pitch" and its distance is a negative number. A propeller with a negative pitch produces drag rather than thrust. Such drag is often described as negative thrust or reverse thrust. A propeller blade is essentially a rotating wing and it has a "blade pitch position" that is nominally the angle between the propeller's plane of rotation and the chord line of the propeller blade at the blade's ¾ span location. During a propeller's operation, the blade pitch position determines the amount of thrust or drag that the propeller blade makes at a given flight airspeed and revolutions per minute (RPM). A "driveshaft" is a rotating shaft that can apply power and that is driven by an engine, motor or gearbox. An exemplary propeller hub is electrical energy-independent, wherein all electrical energy required for said controllable-pitch propeller hub is supplied within said controllable-pitch propeller hub, such as all energy being provided by the alternator that produces electrical energy and comprises an annulus of receiver coils that is coupled to and rotates with said propeller hub.

The purposes of minimizing vibration, the components that are built into a propeller hub typically are mounted such that their mass is distributed with coaxial symmetry with respect to the thrust axis of said propeller hub. Said coaxial symmetry is defined as being "axisymmetric" and said "thrust axis" is defined as that axis about which the propeller hub and propeller blades rotate in normal operation. The engine or motor has a rotating driveshaft that is coupled with and rotates the propeller hub and propeller blades, and that is defined as a "propmotor". Said propmotor is typically attached to an aircraft at a fixed position on said aircraft. In some cases, the fixed attachment of a propmotor to the aircraft may be gimbaled or articulated in order to allow changes in the thrust axis. When a component on said aircraft is stationary and does not move nor rotate, it is defined as being "fixed" relative to the aircraft.

In describing the relative positions of components in this invention, the nominal condition is that quiet ESTOL aircraft use tractor-type propellers whose thrust is directed toward their propmotor and rearward in a direction that is opposite to the direction of flight. However, some variants will use pusher-type propellers whose thrust is directed away from their propmotor and rearward in a direction that is opposite to the direction of flight. Additionally, some variants will use propellers or rotors for vertical take off and landing in which thrust is directed downward and either toward or away from the propmotor. Therefore, use of terms such as aft, rear, in front, front, forward, fore, above, below, at the back, ahead of and behind lack clarity and so shall be minimized in use, and they are supplanted herein by use of the terms "distal" and "proximal" wherever possible. Distal means away from (rather than close-by to) and conveys a remoteness from something, in this case, remoteness from the propeller hub. Proximal means near to (rather than distal from) and conveys a closer proximity to something, in this case, proximity to the propeller hub. In the Figures herein, the direction of flight is to the left of the page and the forward end of a component will be shown in side view as being at the left side of the Figure. Accordingly, the aft or rear end of a component will be shown at the right side of the Figure. Figures that show a frontal aspect of a component will be shown from the perspective of an observer at the rear of the component such that the starboard side of the component is shown on the right side of the Figure.

Inductive coupling is accomplished by employing Faraday's Law of Induction. Faraday's Law of Induction states that any change in the magnetic environment of a coil of a conductive wire will cause a voltage (emf or "electromotive force") to be "inducted" in the coil. Said coil is herein defined as a "receiver coil" because it receives the inducted voltage. To create said inductive coupling, the present patent is an invention that uses Faraday's Law of Induction and the rotation of a propeller hub by its propmotor to effect the induction of an electric voltage that is transmitted into an electric, controllable-pitch, rotating propeller hub without the need for a propeller shaft extension, quill shaft, hydraulic fluid containment and metering or external carbon brushes that rub on commutators or annular contact rings. Faraday's Law of Induction states that the voltage produced in a coil of conductive wire that moves through a magnetic field will depend upon "N", which denotes the number of turns of wire in said coil, "B", which denotes the strength of said magnetic field, "A", which denotes the area of said coil and "t", which denotes the time necessary for the coil of area "A" to move past said magnetic field. Faraday's Law of induction can be expressed by the following formula:

$$V = -N \times B \times A/t \qquad \text{(Equation 1)}$$

It is apparent from said formula that the voltage that can be obtained from a coil moving through a magnetic field will be increased if one increases either the number of wire turns in each coil, the magnetic field strength of each magnet, the cross sectional area of each coil or all three of these parameters. Similarly, the voltage that can be inducted into said coil by it moving through a magnetic field can be increased by reducing the time, "t", that is necessary for a coil area "A" to completely pass through a magnet's field. For rotating electrical machines, said time "t" is reduced if the angular velocity of a moving receiver coil is increased. For a receiver coil mounted on a propeller hub rotating at a given RPM, the angular velocity of said receiver coil increases in proportion to $2 \times \pi \times R$ where R is the radius at which said receiver coil is mounted onto said propeller hub. A larger said radius R will result in a reduced "t" that produces an increased inducted voltage in said receiver coil. If said receiver coil is axisymmetrically attached to and rotating on a propeller hub and is comprised of a ring (i.e. an "annulus") of several evenly spaced receiver coils, then a voltage is inducted into each receiver coil on said annulus whenever it passes close by a fixed (i.e. non-rotating) magnet. If an annulus of evenly spaced fixed (i.e. non-rotating) magnets is positioned axisymmetrically and in close proximity to said annulus of receiver coils, then the rotation of said propeller hub will cause each succeeding receiver coil along said annulus of receiver coils to pass close by each succeeding fixed magnet such that a succession of alternating voltages is inducted into each succeeding receiver coil. Depending upon the relative numbers of magnets and receiver coils used, their spacing along their respective annuli, and the strategic ganging together into a wire harness of the wires from selected sets of receiver coils that are axisymmetrically positioned on their annulus, each of the succession of alternating voltages so inducted can be collected from said receiver coils in separate phases during each revolution of said propeller hub. Such an arrangement comprises the basic ingredients of an alternator, a device that can create an alternating voltage of electricity from mechanical rotation. Said collected succession of alternating voltages can be rectified into a direct, non-alternating electrical voltage that can be used to operate the electrical components inside said propeller hub. Said collected succession of alternating voltages can also be analyzed as to its frequencies and amplitudes and from said analysis can be discerned deliberately and strategically encoded signals that are useful as commands for the electrical operation of said propeller hub.

This invention relies upon the above described electrical phenomenon. This invention attaches a rotating, axisymmetric annulus of receiver coils co-axially to a multi-bladed, controllable-pitch, electric propeller hub that is driven by a propmotor that is mounted on an aircraft, wherein said annulus is placed in close co-axial proximity to one or more separate non-rotating (fixed) annulus of either permanent magnets or energized coils that serve as electromagnets or a combination thereof and that are attached axisymmetrically onto the external surface of said promotor in a position that places said magnets in close proximity to said rotating annulus of receiver coils. By such arrangement, and when said propeller hub is rotating at some RPM, the circumferential angular velocity of said annulus of receiver coils moving in close proximity past said fixed annulus of magnets or energized electromagnets will induct into said receiver coils on said propeller hub a substantial electromotive force (emf) in the form of a succession of alternating voltages that can be appropriately rectified, analyzed and processed so as to provide substantial electrical power to both charge said propeller hub's internal battery and to power electrical components inside said propeller hub. Said electrical components, in turn, utilize said electrical power, with or without the electrical power from said hub's internal high capacity battery, to appropriately drive an internal reversible hubmotor that actuates precise and nearly-instantaneous equal changes in propeller pitch to each of the blades of said propeller hub, as commanded by said aircraft's flight controller inside said aircraft. Said hubmotor is a servomotor that is a rotary actuator or linear actuator that provides precise control of angular or linear position, velocity and acceleration. It consists of a suitable hubmotor that is a servomotor coupled to a blade pitch sensor that provides position feedback. The electrical power is delivered to said internal reversible hubmotor without the need for the friction and wear of rubbing by carbon brushes on metal slip rings and without the need to contain any hydraulic fluid. In some embodiments, for the purpose of providing redundancy, greater power and for sending signals to the electronic control unit, multiple coaxial annuli of receiver coils are used along with multiple coaxial annuli of magnets.

When one or more large-diameter, multi-bladed propellers whose rotation is driven by a propmotor on an aircraft and when said propellers are equipped with this invention's electrically-controllable propeller hub, said propeller hub's electric internal reversible hubmotor is of sufficient size and power to rapidly and substantially change, within two seconds, said aircraft's thrust, lift, drag or yaw moment and thereby control said aircraft's speed, climb rate or sink rate. Said rapid changes will enable said aircraft to perform said extraordinary nearly-instantaneous maneuvers of aerial agility, even during flight operation at low dynamic pressures. In order to accomplish this, said internal reversible hubmotor inside said propeller hub is provided with sufficient inducted electrical power to suddenly, forcefully and equally actuate each of its propeller blades so as to precisely and substantially change its blade pitch. What constitutes sufficient electrical power depends upon the size of the propeller, its number of blades, its rotational speed in revolutions per minute ("RPM") and the electrical specifications of said internal reversible hubmotor. The several concerted ingredients of this invention, comprising a propeller hub with inductive coupling, an internal battery, redundant wireless electronic control of blade pitch, battery charging and di-directional communication with an aircraft's flight controller, a hub case whose neck-shaft has torquemeter and thrust meter sensors, and, in some embodiments, a hub-specific and propmotor-specific co-axial splined driveshaft, reliably provide remedies to the several problems cited herein. Moreover, the ingredients of this invention can be retrofitted to some existing types of propeller hubs that are used with fossil-fueled and/or electric propmotors.

Said changes in propeller pitch can be rapidly executed and can be of amplitudes comprising changes of more than 90° of blade pitch position. Said changes are made by rotating the shank of each propeller blade within its bearings in its propeller blade socket in the hub in order to rotate the blade about its long axis. Said rapid changes to pitch can be accomplished inside said propeller hub by any of a number of conventional actuating mechanisms. Two common such conventional pitch change actuating mechanisms employ either an eccentric propeller blade nub bearing or a concentric bevel gear (propeller blade gear) attached to the inner end of the shank of each propeller blade inside the propeller hub. Said extant actuating mechanisms that move said propeller blade nub bearing or said bevel gear include but are not limited to electric servomotors (of either direct drive or geared-motor drive) that actuate linear jackscrews or ball-screws that move slotted blocks, or rotate bevel gears, bell-cranks or other means. The electrical power made available inside of said propeller hub by this invention can be used for any of said pitch change actuating mechanisms. Regardless of the type of pitch change actuating mechanism, all mechanisms precisely set and hold blade pitch at the specified desired pitch angle and all mechanisms have limit switches and pitch-stops that ensure that blade pitch is kept within nominal operational limits. In addition, all mechanisms in this patent have a blade pitch angle position sensor that electronically informs the hub's electronic control unit of the current blade pitch angle.

The electrical power made available inside of said propeller hub by this invention can also be used to actuate other electrical devices that are placed co-axially and axisymmetrically inside the propeller hub so that they can tolerate being rotated at the propeller RPM employed in normal use, with said devices to include but not be limited to lights, cameras, radio transmitters, speakers, antennae and other functions.

To create said inductive coupling in said propeller hub, one or more receiver coils attached to and rotating with said propeller hub must see a change in its magnetic environment, which change is created by attaching one or more magnets, whether they be permanent magnets, electromagnets or both, to the external surface of said propmotor in close apposition to said receiver coil(s). Said receiver coils are arranged in an annulus (i.e., a ring-shape) that is attached axisymmetrically to said propeller hub. In some embodiments, more than one annulus of receiver coils, each having a different radius, are axisymmetrically attached to said propeller hub. Said magnets are likewise best arranged in one or more non-rotating annuli of differing radii wherein said annuli are attached axisymmetrically to the forward external surface of said propmotor and positioned with close apposition across an air gap from each of said propeller hub's annuli of receiver coils, respectively. In alternative embodiments, a solitary magnet is attached to said propmotor in a position with close apposition across a narrow air gap that is on the order of 2 mm from a surface of a passing receiver coil on said propeller hub's annuli of receiver coils. In embodiments with more than one annulus of receiver coils, said solitary magnet is attached to said propmotor such that an actuator moves said magnet on command to be in apposition across a narrow air gap to any of the passing receiver coils on said annuli of receiver coils, so as to change the voltage and thereby the signal inducted into said propeller hub such that said signal serves as a command signal to either increase or to decrease pitch. Said magnets are permanent magnets or electromagnets that consist of coils energized with a current of electricity. Said electrical current applied to said electromagnets on said propmotor is supplied from the aircraft's main battery pack and consists of a direct or an alternating current whose frequency is tailored to not only create by inductive coupling an alternating voltage into said annulus of receiver coils, but also to embed into said alternating voltage a command signal for either increasing or decreasing pitch, wherein said command signal is detected and implemented by said electronic control unit inside said propeller hub. Said frequency is also suitable for inductively charging said propeller hub's internal high capacity battery and, in some embodiments or circumstances, is also tailored so as to produce and sustain resonant inductive coupling into said receiver coils. In resonant inductive coupling, the receiver coil is connected to a capacitor so as to form a tuned inductor/capacitor circuit that can resonate at a certain frequency if and when said frequency is applied to the adjacent electromagnet that drives the induction, with the result being a more efficient transfer of energy into the receiver coil and that said transfer can work across a larger air gap. The application of said direct or alternating current of a strategic frequency and amplitude to said electromagnets is controlled by the aircraft's control system using a feedback signal transmitted from said propeller hub's electronic control unit to said aircraft control system wherein said feedback signal conveys the hub's rotational position, torque level, thrust level, blade pitch, RPM, battery status and other information. When at rest, said inductive coupling also serves to charge and maintain said propeller hub's internal high capacity battery.

Safety, security and reliability requirements dictate that said propeller hub should provide alternative paths for transmitting a signal to and from the electronic control unit inside said propeller hub. Accordingly, the electronic control unit includes a wireless signal transceiver. In this patent, said paths all are capable of reliably transmitting said signal across an air gap and thereby not requiring carbon brushes or slip-rings. Said paths are 3 in number and consist of the following: 1) a wireless transmission protocol ("wi-fi") that is modulated by the amplitude, timing, pulse-width or frequency of radio waves such as wi-fi or Blue-Tooth, and 2) a signal transmission protocol that is modulated by the emission and reception of light (optical wireless communications or OWC) such as free-space optical communication or wherein Li-Fi uses light from light-emitting diodes (LEDs) as a medium to deliver high-speed communication in a manner similar to wi-fi, and 3) a signal transmission protocol that is modulated by either the frequency (FM) or amplitude (AM) of the electrical energy supplied to said electromagnets on said stationary annuli of electromagnets on said propmotor. Any one of these three paths is sufficient to control the pitch-changing operations of said propeller hub. One of these three paths serves as the primary path while another path serves as both a back-up path as well as a supplemental path that performs validation and verification of the signals in said primary path. Signal strength of each path is more than sufficient for successful transmission under all anticipated conditions. Signal integrity is hardened, encrypted and protected as needed against radio frequency interference (RFI), hacking and cross-talk. Signal integrity includes fault-detection by self-diagnosis and notifications of same.

Important to this invention is the close proximity with which the fixed annulus of magnets or electromagnets is placed relative to a rotating, hub-mounted annulus of receiving coils. The desired proximity to enhance the amount of voltage inducted is to have a narrow and uniform gap between said stationary and rotating annuli. Said proximity of these two annuli is achieved by attaching said propeller hub to said propmotor such that the external face of said propeller hub is in close proximity to the external face of said propmotor. Said proximity is nominally limited by the practical need to provide a service gap that offers adequate service access for a mechanic to loosen or to tighten the propeller bolts that attach said propmotor to said propeller hub. Said service gap, when narrow, enhances the strength and light-weighting of the structure of the mounting hardware for the non-rotating annulus of magnets or electromagnets and facilitates their effectiveness in inducing a voltage into the receiver coils.

To eliminate the difficulty of access for a mechanic to tighten or loosen propeller flange bolts, this patent includes an innovation wherein a removable, male-splined coaxial driveshaft is attached to said propeller hub before said propeller hub is joined to the propmotor. Said driveshaft is equipped with a suitable means of attachment to said propeller hub, whether that attachment is by conventional propeller mounting flanges or by other means. Said male-splined coaxial driveshaft is then inserted and secured inside the hollow rotor shaft of said propmotor, wherein said hollow rotor shaft has an internal female spline designed to match and fit said male-splined coaxial driveshaft. Said splines are of sufficient size and strength to bear with suitable margins all of the positive and negative torque and vibration loads that occur during normal operation of said propeller. Said driveshaft also has two flanges that serve as thrust bearing faces—one distal face for the positive thrust and one proximal face for negative thrust (e.g. windmilling drag) generated by said propeller. The distal end (opposite that of its propeller mounting flange) of said driveshaft terminates just inside the distal external surface of the propmotor. The distal terminus of said driveshaft provides a receptacle for a detachable metal endcap that effectively secures the driveshaft to the propmotor. Said metal endcap comprises a thrust bearing face and a shoulder for the stacking of thin thrust bearing shim washers in order to enable the precise adjustment of the desired narrow air gap between said rotating annulus of receiver coils and said fixed annulus of magnets. Said endcap comprises a removable drive-gear (or pulley) that provides a power-take-off just outside the distal surface of the propmotor that is useful for driving components such as pumps, fans or gearboxes that actuate other components on said aircraft. Said driveshaft serves to provide a mechanic with adequate access to fasteners and thereby simplifies and reduces the time necessary for removing and re-installing said propeller hub to said propmotor. The size of said narrow air gap determines the strength of the magnetic field to which receiver coils are exposed, and thereby helps determine the amount of voltage inducted into said coils. The size of said narrow air gap is consistently greater than the size of the axial play in the thrust bearings of said coaxial splined driveshaft. Said coaxial driveshaft accordingly provides a novel method by which any of a variety of propellers of different designs with different propeller mounting flanges can be readily adapted to be rapidly attached to and driven by an electric propmotor that has a compatible hollow rotor shaft.

The method of attachment of the axisymmetric annulus of receiver coils to the propeller hub can be of two types. Type I uses an annular, axisymmetric spinner bulkhead that attaches to the external surface of said propeller hub by screws, bolts, clamps, bonding, welding or other secure means, and to which is securely attached said axisymmetric annulus of receiver coils. In Type I installations, the wire harness emanating from said annulus of receiver coils is connected to the internal wire harness that is inside of said propeller hub by using secure detachable connectors arranged so as to tolerate the centrifugal forces induced at the maximum anticipated RPM of that propeller. Type I attachment using said spinner bulkhead is an innovation that improves the versatility of this invention because it enables a variety of propeller hubs to use a variety of different annuli of receiver coils, including those that are upgrades that incorporate new communication protocols, those that have dual annuli, and those that include resonant inductive coupling. Type II attachment of said annulus of receiver coils to said hub is that in which said annulus is directly attached by screws, bolts, clamps, bonding, welding or other secure means, to the external aft surface of said propeller hub rather than to said spinner bulkhead. Both Type I and Type II attachments position said annulus of receiver coils so that said non-rotating annulus of magnets or electromagnets can be compatibly mounted on the external forward surface of the propmotor such that a uniformly narrow air gap on the order of 2 mm separates a surface of each receiver coil from a surface of said magnet(s) or electromagnet(s). A wider air gap that is more immune to fouling by foreign bodies, dirt, etc. is an alternative embodiment, but said wider air gap would entail a reduction in inducted voltage unless resonant inductive coupling is used.

In some embodiments, a single non-rotating fixed magnet may be used on the propmotor in order to better provide access for a mechanic to the propeller flange bolts. In such case, said single magnet can be moved a short distance by an electric actuating device in order to re-locate its air gap alongside any one of two or even three different annuli of receiver coils, wherein each said annulus has a different radius and each is assigned a different command function in the communication protocol.

The diameter of the annulus of receiver coils and its number of coils, as well as the propeller RPM, determine the value of "t" (for time) in the formula for Faraday's Law of Induction (Equation 1). Minimizing "t" increases the voltage induced into the receiver coils. Said diameter of said annulus of receiver coils must be large enough to reduce "t" while being small enough to be confined within the outer diameter of the propeller hub. The diameter of the non-rotating, stationary, propmotor-mounted annulus of permanent magnets (or electromagnets) must be such that its magnets are positioned across a narrow air gap from and in close proximity to said receiver coils. Said proximity may be achieved by mounting said stationary annulus in one or more of three possible positions, which are along the inner surface, outer surface or aft surface of said receiver coils. When mounted along said inner or outer surface, the result is a radial flux alternator and when mounted along said aft surface, the result is an axial flux alternator. Said mounting must use an annulus whose diameter is of a size that creates a uniformly narrow air gap on the order of 2 mm between the surfaces of said magnets and said receiver coils. Alternative air gaps may have larger or smaller dimensions as long as those dimensions provide sufficient inducted voltages.

The number and size of receiver coils in a rotating annulus and the number and size of permanent magnets or electromagnets in a non-rotating annulus may be any number that ensures an efficient and sufficient supply of inducted voltage to operate the hub mechanisms under all circumstances. For the purposes of increasing communication options across the air gap, more than one annulus of receiver coils may be used and more than one annulus of permanent magnets or electromagnets may be used. Electromagnets in the annuli may be those with cores of any type including open, closed, toroidal, ferromagnetic, ferrite, iron, plastic or other material. The permanent magnets used are those known to deliver a high maximum energy product value that confers a strong magnetic field.

The number of wire turns and the wire size used for the individual coils used as receiver coils or as electromagnets is optimized to deliver the necessary electrical voltage and to fit the available spaces along the annuli. The Faraday formula shows that a greater number of wire turns increases the inducted voltage in said coils.

The orientation of the magnetic fields of the coils used in both annuli is that which results in the most efficient production of inducted voltage into the receiver coils to a degree sufficient for the electrical power needed to operate said propeller hub. In the embodiment in which resonant inductive coupling is used[1], both the receiver coil and electromagnet coil are paired with a capacitor to create a resonating magnetic field that can induct voltage into the receiver coil across a larger air gap.

In the case of a non-rotating annulus comprised of electromagnets, the timing and amount of electricity supplied to said electromagnets, whether by direct current or alternating current, is that which results in the most efficient production of inducted voltage in the receiver coils to a degree sufficient for the electrical power needed to operate said propeller hub, while also providing a means of signaling the electronic control unit of an intended command for pitch change. In the embodiment of said propeller hub wherein a non-rotating annulus is comprised exclusively of permanent magnets, there is no electricity needed by said non-rotating annulus to produce the inducted voltage in the receiver coils and the strength and number of said permanent magnets is such that said inducted voltage is sufficient for the electrical power needed to operate said propeller hub.

To provide the electricity needed for pitch control under all circumstances, this invention uses the innovation of an internal battery of high power density that is securely attached co-axially and axisymmetrically inside said propeller hub. Said battery is sized to have a capacity that can provide enough energy and power to enable the internal reversible hubmotor to maximally change propeller pitch under all flight conditions including during a period of time at least equal to said aircraft's reserve flight endurance. Said battery is normally continuously being recharged by the electricity produced by the inducted voltage in this invention's rotating annulus of receiver coils across the narrow air gap from the non-rotating annulus of permanent magnets or electromagnets that is affixed to the propmotor. Said high energy density battery is nominally a Lithium-ion type but alternative and future embodiments of said battery may be of any safe chemistry. Said battery serves as an electrical ballast to both limit and maintain electrical current and serves as an accumulator to ensure the ability to feather or un-feather the propeller blades on-demand regardless of whether the propeller hub is rotating. Said battery solves the problem of being able to still change pitch when there is no inductive energy produced in said propeller hub, such as when there is an absence of rotation or there is some failure or malfunction of the inductive system. In such case, the electronic control unit detects said failure of induction and transmits a feedback signal to alert the aircraft's flight controller of the need to land the aircraft as soon as safely possible. Said battery is mounted such that its mass is axisymmetrically distributed, and at a position on the front of the hub from which it can be easily removed for service or replacement.

The surface of the neck of the propeller hub shaft that is adjacent to the hub's propeller mounting flange is the location at which a set of strain gauges are bonded to said shaft in order to sense the amount of torque and thrust being applied at said location. A strain gauge comprises a sensor that, when correctly bonded to a rotating shaft, deforms when a torque or thrust is applied to said shaft. Said deformation instantly creates a specific electrical resistance of said strain gauge and said electrical resistance can be converted into an electrical signal whose magnitude is related to the amount of said deformation. Said magnitude of said electrical signal is then calibrated so it can represent the amount of torque or thrust being applied to said shaft. In this invention, said electrical resistance occurs in an electrical circuit that is connected to the hub's electronic control unit by wires that are securely routed on said propeller hub. The electronic control unit converts said electrical resistance into torque and thrust values and wirelessly communicates said torque and thrust values to the aircraft's flight controller. Said strain gauges and said electronic control unit thus perform as both a torquemeter and thrustmeter. Said torquemeter and thrustmeter are able to circumvent the usual problems of shaft torquemeters and thrustmeters by being applied to a relatively low-RPM, smooth-running shaft (without the pulsatile deformations that occur with internal combustion engines) and by having a direct wiring connection from strain gauges to the electronic control unit without the limitations of using carbon brushes on slip rings. Said aircraft flight controller compares and validates the torque value from the hub's torquemeter with the torque value that it simultaneously derives from its known instantaneous values of shaft RPM and propmotor power level and then uses said torque values to guide the amount of power that is applied to said propmotor so that it does not overstress the propmotor and propeller hub or blades. Four strain gauges are attached to the rotating shaft for each Wheatstone bridge circuit used to sense either the torque or thrust on said shaft.

The electronic control unit (ECU) controls the following functions: 1) the processing of the induced voltages emanating from said receiver coils, 2) the charging and monitoring of the condition of said hub's internal battery, 3) the reception of wireless command signals from the aircraft's flight controller, 4) the processing of said command signals in order to provide the correct timing and amount of electricity to be fed to the internal reversible hubmotor to execute said commands, 5) the movement of the propeller blade pitch of each propeller blade to the desired position within its appropriate limits of rotation, 6) the maintenance of appropriate propeller blade pitch by means of both motor control and, in some embodiments, preventing back-driving by means of an internal friction or wrap-spring clutch, 7) the limit switch function that ensures that pitch remains within its appropriate limits of rotation, 8) the feedback signaling to the aircraft's flight controller of propeller RPM, propeller blade pitch angle, propeller hub shaft torque and thrust level, battery condition and any malfunction in the operation of the components inside said hub.

The path of the internal wire harness from said receiver coils and from said strain gauges to said electronic control unit (ECU) of said propeller hub is so arranged as to ensure that all wires are secured against the centrifugal, bending, vibration and thermal loads that will be encountered in normal operations.

The maneuvering effects of said sudden change in propeller pitch by the propeller hub's internal reversible hubmotor can be augmented by appropriate sudden coordinated concurrent changes in the torque of that propeller's propmotor—i.e., the electric motor that rotates the propeller. Such sudden changes and maneuvers have not been a design priority or capability in prior aircraft and have been of limited authority because of the challenge of reliably and rapidly providing large amounts of instantaneous power to the components inside of a propeller hub when said power was delivered by the time-consuming flow of hydraulic fluid through a metered orifice or delivered by contacts consisting of carbon brushes.[2] Said challenge can be overcome by the innovations presented in this patent, including this hub's high energy density internal battery with or without an ultra-capacitor, a high power density efficient internal reversible hubmotor, the high magnetic fields available from today's permanent magnets and the wireless communications and control technology extant in modern electronics. Pitch control by the propeller hub invention in this patent is nominally controlled autonomously, but in some embodiments is controlled manually. When controlled autonomously, said control consists of signals that are wirelessly delivered from the aircraft's flight controller to the electronic control unit inside said propeller hub wherein said signals are determined by computer analysis of sensor fusion from a number of sensors including but not limited to sensors for RPM, propeller blade position, propmotor torque, propmotor power level, aircraft height above ground level, rate of descent, airspeed, groundspeed, wing flap position, fuselage pitch angle, yaw angle, landing gear position, fellow propmotor power level and detected air traffic conflicts.

The various preferred embodiments of the invention described above, though not exhaustive of all possible variants, convey what is desired to be secured by this patent as claimed below.

REFERENCES FOR HUB

[1] https://en.wikipedia.org/wiki/Resonant_inductive_coupling

[2] https://www.enginehistory.org/Propellers/Curtiss/Turbo-electric/Turboelec tric.shtml see page 15 of Seeley application: Curtiss electric prop used carbon brushes.

TABLE 1

Nomenclature Summary

3D: three dimensional
annulus: a ring shape that may contain symmetrically distributed components
electromagnet: a coil of wire that when energized with an electric current, produces a magnetic field
emf: electromotive force, i.e., a voltage
ESTOL: extremely short take-off and landing
hubmotor: a motor, located inside a propeller hub, that reversibly changes the pitch of said propeller hub's propeller blades
kW: kilowatt, unit of power = 1.34 horsepower
receiver coil: A coil of wire into which an emf can be inducted
propeller pitch: the theoretical forward or backward distance traveled through a solid medium in a single revolution by a propeller blade at its 0.75 blade radius
propmotor: a motor that rotates a propeller hub and its blades
RPM: revolutions per minute

BRIEF DESCRIPTION OF SEVERAL VIEWS OF THE DRAWINGS

The accompanying drawings are included to provide a further understanding of the invention and constitute a part of this specification. They illustrate the embodiments that comprise the invention, and together with the description of their components serve to explain a nominal operation of the system. In side views, the forward portion is shown on the left side and in frontal views, the starboard portion is shown on the right side.

DETAILED DESCRIPTION OF THE ILLUSTRATED EMBODIMENTS

As used herein, the terms comprises, comprising, includes, including, has, having or any other variation thereof, are intended to cover a non-exclusive inclusion. For example, a process, method, strategy, article or apparatus that comprises a list of elements is not necessarily limited to only those elements but may include other elements not expressly listed or inherent to such process, method, strategy, article, or apparatus. Also, use of a or an are employed to describe elements and components described herein. This is done merely for convenience and to give a general sense of the scope of the invention. This description should be read to include one or at least one and the singular but it also includes the plural unless it is obvious that it is meant otherwise.

GENERAL: The invention is that of the hardware and software components, concepts and operational processes that include the important components in an electric, controllable-pitch propeller hub and driveshaft that employ the induction of electrical voltage across an air gap and into said propeller hub as a unique design for use in electrically-powered aircraft.

The following detailed description of the illustrated embodiments necessarily includes some redundancy with the descriptions provided in the SUMMARY OF THE INVENTION above, but only to the extent that it provides the reader the convenience of proximate context for the description at hand. Where appropriate, the Figures are deliberately drawn with omission of those components whose depiction would obscure a clear view of the items of interest. The components and ingredients depicted in the following Figures are shown schematically in nominal sizes and shapes. The actual sizes and shapes of all such components and ingredients may be different in different embodiments of this invention while still comprising its innovations in principle, operation, function and purpose.

Figure 1:
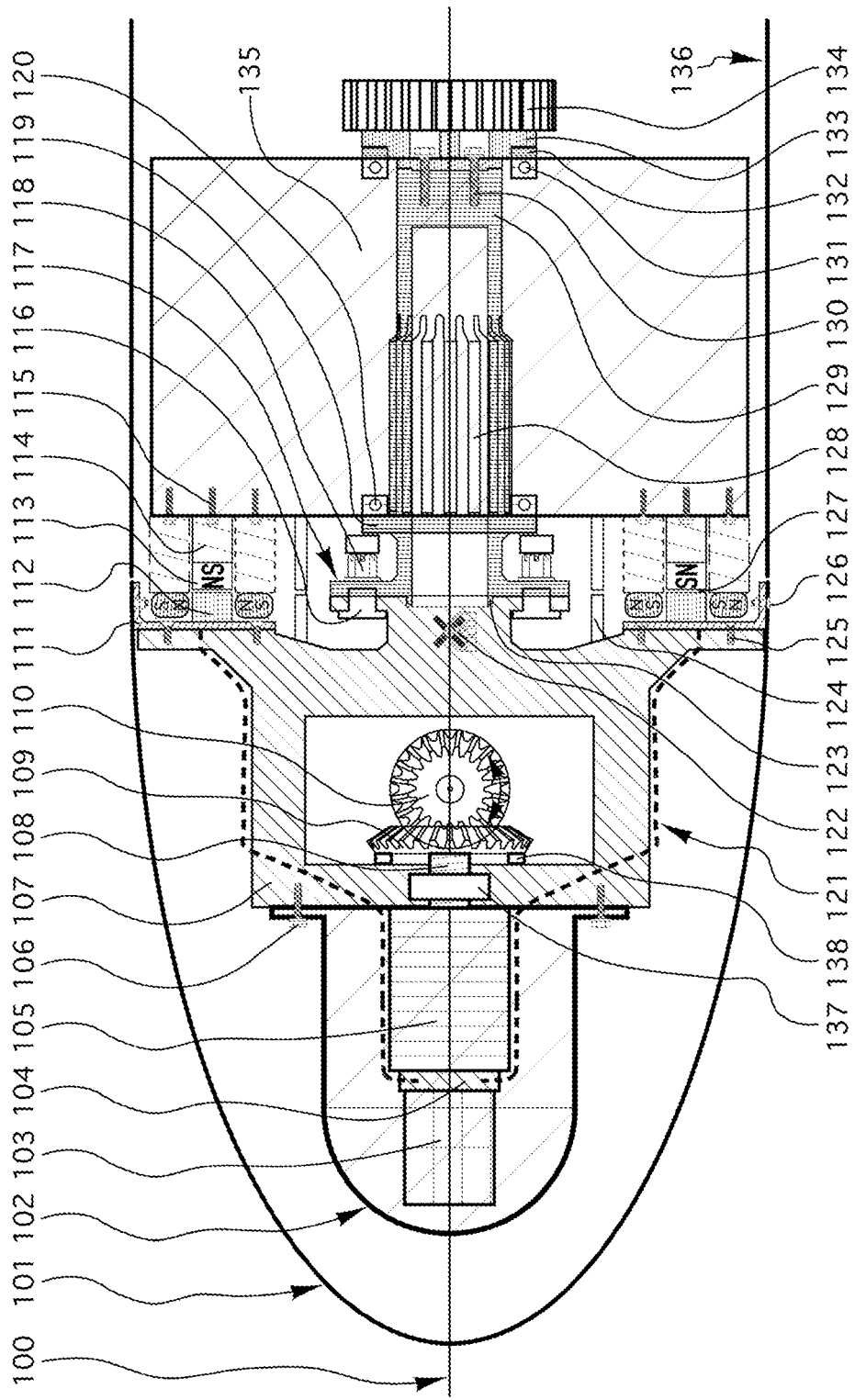
FIG. 1 depicts a side view of a hub with a bevel gear pitch actuator, a splined coaxial driveshaft with bolt-on metal endcap with drive gear and the magnet interfaces across the air gaps from the inner, outer and aft surfaces of the receiver coils.

FIG. 1 shows a side view of the inductively-energized, electrically-powered propeller hub including spinner, propmotor, nacelle and male-splined coaxial driveshaft with a conventional bevel-gear type of propeller pitch changing mechanism. The centers of the hub, propmotor and driveshaft are axisymmetric with respect to the propeller hub's thrust axis 100. The surface of the axisymmetric, dome-shaped propeller spinner 101 is depicted in side view, showing it to enclose the entire propeller hub. The surface of the axisymmetric, dome-shaped internal dust cover 102 encloses the hub's internal battery, electronic control unit and internal reversible hubmotor and it is held in place by bolt 106 and there are four such bolts that fasten into threaded receptacles on said hub. The hub's axisymmetric rectangularly outlined internal battery 103 is shown in side view in coarse double crosshatch. The hub's axisymmetric electronic control unit 104 is shown in side view in diagonal crosshatch adjacent to said battery 103. Said electronic control unit 104 includes a wireless signal transceiver. The hub's axisymmetric internal reversible hubmotor 105 is shown in side view with vertical crosshatch. The hub's main structural hub case 107 is shown in side view in diagonal crosshatch. The internal reversible hubmotor's co-axial gearshaft 108 is shown in side view in fine crosshatch. Said co-axial gearshaft is connected to and rotates the large bevel gear 109, known as the motor gear, in order to change propeller blade pitch angle. In this embodiment, the propeller blade shanks each have a co-axial small bevel gear 110 known as a propeller blade gear and said propeller blade gears all engage with the motor gear enabling the reversible hubmotor to simultaneously and equally rotate each of the propeller blades. The propeller blade gear is shown in planform view as the innermost component of the propeller blade shank. For clarity, additional propeller blade shanks are omitted from FIG. 1. Said small bevel gear 110 is rotated by said large bevel gear 109 in order to change propeller blade pitch angle. Said large motor gear 109 also interdigitates with and actuates all other small bevel gears on each of the other propeller blade shanks that are components not shown on said propeller hub. Propeller spinner bulkhead 111 is shown in side view with diagonal crosshatch. One of several receiver coils 112 is shown in side view in fine horizontal crosshatch attached to the aft external surface of said spinner bulkhead. Said receiver coil 112 represents one of several identical receiver coils that are configured on an annulus of receiver coils that is attached to and rotates with said spinner bulkhead. Said annulus of receiver coils may alternatively be attached directly to said structural hub case 107. A magnet 113 is shown in side view wherein said magnet is positioned across a narrow, nominally 2 mm air gap from the aft surface of said receiver coil 112. Said magnet 113 is shown as a permanent magnet whose "N" or North pole is positioned closest to said receiver coil 112 while its "S" or South pole is on the opposite side of said magnet. In alternative embodiments an electromagnet comprising a coil of wire and core may take the place of said permanent magnet 113. A magnet support strut 114 is shown in side view in coarse diagonal crosshatch as a structure that holds magnet 113 and attaches it to the face of the propmotor 135 that is proximal to said hub. Said magnet support strut 114 is, in some embodiments, one of a plurality of such struts that each hold a fixed annulus of magnets and wherein said plurality of struts likewise attach said fixed annulus of magnets to the proximal face of said propmotor 135. A small bolt 115 secures each support strut 114 to said propmotor. A female-threaded, combination drive-lug/dowel pin 116 that is pressed into the hub's propeller mounting flange is shown in side view. The aft face 117 of the coaxial driveshaft's propeller mounting flange is shown in side view. One of the six propeller mounting bolt heads 118 is shown in side view in its position on said propeller mounting flange. The forward thrust bearing flange 119 of the coaxial driveshaft 129 is shown in fine vertical crosshatch. The forward thrust bearing 120 of the propmotor 135 is shown in side view. The internal wire harness 121 is shown as a dashed line in side view, depicting its path from a receiving coil 112 to the electronic control unit 104. The matrix of strain gauges 122 are attached to the round neck-shaft of the propeller hub. The wire harness from said strain gauges to the electronic control unit 104 is not shown. A cross section of the coaxial driveshaft's forward hub-indexing ring 123 is shown in side view as it fits into a recess in the aft surface of the axial center of the propeller mounting flange of said propeller hub's main structural hub case 107. The forward component of the Li-Fi signaling device 124 is shown attached to the aft face of the propeller hub case 107 where it is aligned across an air gap with its aft component, the matching member of said Li-Fi signaling device. A duplicate of component 124 and its matched aft member are shown symmetrically positioned in the upper portion of the hub-propmotor interface, thus comprising dual Li-Fi signaling devices. These dual Li-Fi signaling devices provide bi-directional signaling; from the aircraft's flight controller to the hub's electronic control unit 104 and from the hub's electronic control unit 104 to the aircraft's flight controller. One of the several axisymmetrically arrayed fastener bolt 125 that attach the spinner bulkhead to the hub's main structural hub case 107 is shown at the bottom of FIG. 1, and a duplicate of said bolt 125 is shown symmetrically located in the top portion of FIG. 1. One of the several axisymmetrically arrayed counter-sunk screw 126 that attach the spinner 101 to the spinner bulkhead 111 is shown at the bottom of FIG. 1, and a duplicate of said screw 126 is shown symmetrically located at the top of FIG. 1. The narrow air gap 127 in the lower portion of FIG. 1 is between a receiver coil identical to 112 and a magnet identical to 113. Said narrow air gap is on the order of 2 mm and can be adjusted by the stacking of thin thrust washers 132 on the first shoulder of the rear metal endcap 133. It should be noted that said magnet adjacent to said air gap 127 has its "S" or South pole adjacent to said air gap, in contrast to the positioning of magnet 113 symmetrically shown in the top portion of FIG. 1, which has its "N" or North pole adjacent to its adjacent air gap. Said South and North positions for said magnets are deliberate so as to make the two receiver coils, top and bottom in FIG. 1, when their coil wires are connected and when said propeller hub is rotating, conduct an alternating current that can be rectified and utilized to power the propeller hub. The male spline 128 on the outer surface of the coaxial driveshaft 129 interdigitates with a matching female spline on the inner surface of the propmotor's hollow rotor shaft and transmits the torque of said propmotor 135 through its propeller mounting flange 117 to said propeller hub. The coaxial driveshaft 129 is shown in fine vertical crosshatch as having a solid rear (distal) block that has female threaded receptacles 130 for attaching the metal endcap with its distal thrust bearing flange 133 shown in fine horizontal crosshatch wherein said endcap includes coaxial drive gear 134 as its distal-most component. A stack of thin thrust bearing washers 132 is located just proximal to said distal thrust bearing flange 133 and the face of said stack of washers 132 bears upon the propmotor's distal thrust bearing surface 131. The narrow gap between the thrust bearing washers and the thrust bearing surface is known as the thrust bearing clearance, and a similar thrust bearing clearance is present at the gap between the propmotor's proximal thrust bearing surface and the driveshaft's proximal thrust bearing flange. These thrust bearing clearances are always smaller than the air gap between the receiver coils and the fixed magnets. The inner surface of the cylindrical propmotor nacelle 136 fits and fairs smoothly with the streamlined shape at the base of the propeller spinner 101. A wrap spring clutch 137 surrounds the gearshaft 108 and prevents movement or back-driving of blade pitch positions. One of the two limit switches 138 is shown attached to the motor gear 109 and its identical mate (not labeled) is shown to be axisymmetrically located on the motor gear above the thrust axis.

Figure 2:
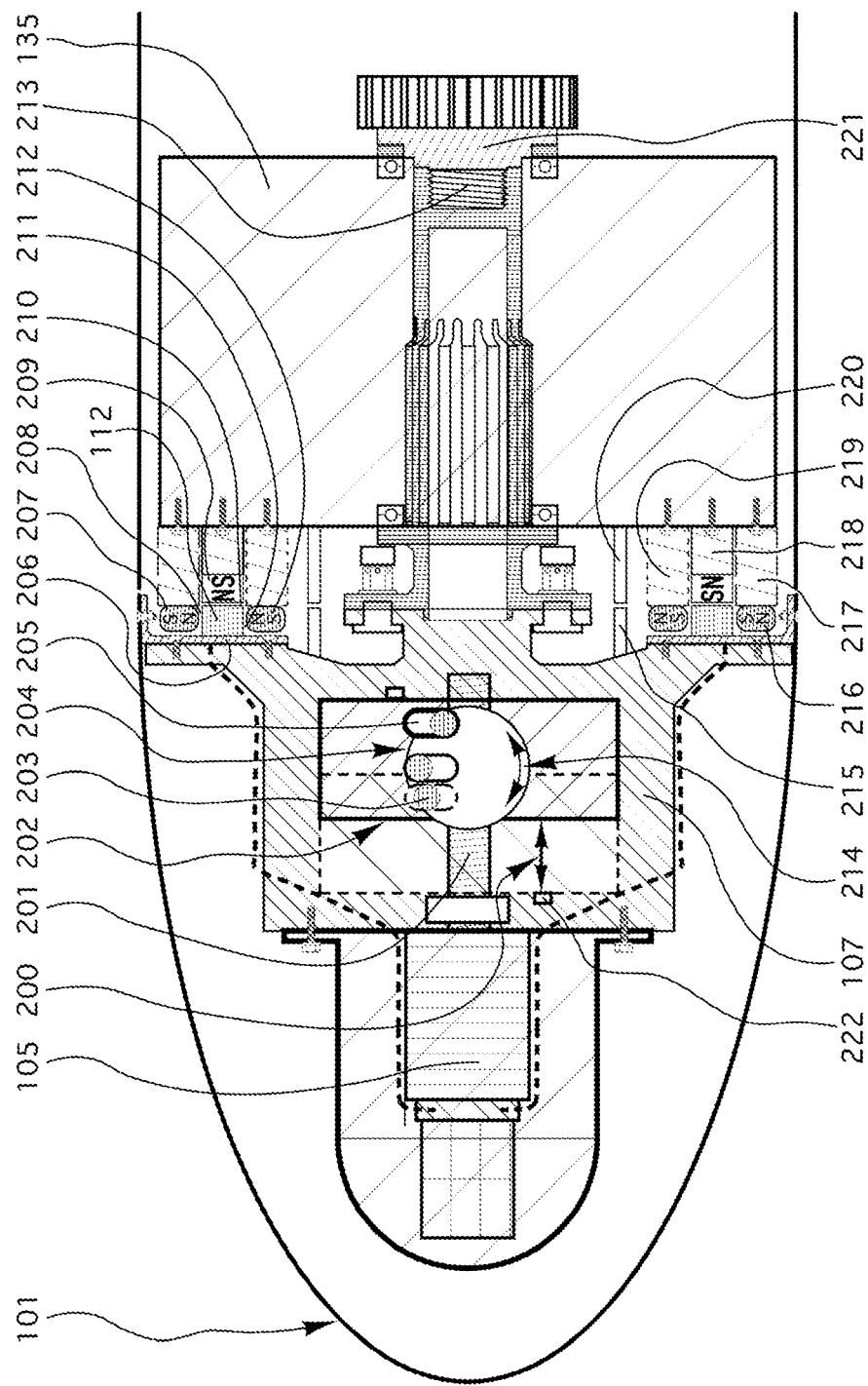
FIG. 2 depicts a side view of a hub with a slot-block pitch actuator, a splined coaxial driveshaft with female threaded receptacle for a metal endcap with drive gear and the magnet interfaces to the receiver coils.

FIG. 2 shows a side view of the inductively-energized, electrically-powered propeller hub including spinner, propmotor, nacelle and splined coaxial driveshaft with a conventional slot-block type of propeller pitch-changing mechanism. A horizontal double arrow 200 indicates the range of travel of the slot-block whose forward edge 202 is depicted by an arrow as part of said slot-block's thick-lined diagonally-crosshatched, vertically oriented rectangular outline. The jackscrew shaft 201 driven by the internal reversible hubmotor 105 moves the slot-block fore and aft in order to alter propeller pitch angles of each propeller blade. At the internal extremity of each propeller blade shank and attached just inside its round perimeter 204 is a circular eccentric propeller blade nub bearing 203 depicted in fine horizontal crosshatch. As said propeller blade nub bearing slides in a vertically oval slot 205 that is depicted by a heavy solid line in said slot-block 202 during the fore-aft motion of said slot-block, said nub/bearing's slide causes a rotation of the attached propeller blade shank to different pitch angles. Two additional vertically oval slots are shown in positions adjacent to slot 205, each showing the resulting different rotated position of the circular propeller blade nub bearing inside said oval slots. The forward-most of these two additional oval slots has a dashed outline and encloses the eccentric propeller blade nub bearing 203. Said dashed outline oval slot is rigid in its location inside of the dashed outline of the coarsely-cross-hatched vertically oriented rectangular slot block 202 when moved to its forward-most position. An optional spinner bulkhead 206 is shown attached with screws that thread into tapped holes in the aft external surface of the propeller hub case 107. Other smaller sizes of said bulkhead 206 may be used in other embodiments, including those in which the receiver coil 112 is attached directly to the hub case rather than to the spinner bulkhead. Said bulkhead 206 is shown in side view and is attached to a receiver coil 112. Said spinner bulkhead supports and attaches the propeller spinner 101. The North pole of an electromagnet 207 is shown positioned in close proximity across a narrow air gap 208 from said receiver coil 112's outer surface. Said electromagnet 207 is attached to and supported by a rectangular magnet support strut, shown in coarse diagonal crosshatch with a dashed line outline, that is symmetric with and identical to magnet support strut 217 in the lower portion of FIG. 2. All magnet support struts are attached to the forward (i.e. proximal) external surface of promotor 135. As a group, said magnet support struts collectively support each annulus of magnets in the various embodiments of this invention, and attach thereby said annuli to the proximal external surface of said propmotor. The North pole of a permanent magnet 209 is shown positioned across a narrow air gap 210 from the aft surface of receiver coil 112. Said permanent magnet 209 is attached to and supported by a rectangular magnet support strut that has a solid line outline and is symmetric with and identical to the magnet support strut 218 shown in the lower portion of FIG. 2. Air gap 211 separates the inner surface of receiver coil 112 from the North pole of an electromagnet 212 that is mounted on a magnet support strut that is outlined with a short-dashed line and that is symmetric to and identical to a magnet support strut 219 shown in the lower portion of FIG. 2. Metal endcap 221 includes an aft drive gear and attaches with a single large male threaded stud 213 to the female threads in the aft end of coaxial driveshaft 129. A circularly curved double arrow 214 indicates the rotation path of the propeller blade shank during the operation of the pitch-changing mechanism comprised of a fore-aft movement of the slot-block 202. The Li-Fi signaling devices in FIG. 2 are shown with the forward component of the Li-Fi signaling device 215 attached to the aft face of the propeller hub case 107 where it is aligned across an air gap with its aft component 220, the matching member of said Li-Fi signaling device. A duplicate of components 215 and 220 is shown symmetrically positioned in the upper portion of the hub-propmotor interface, thus comprising dual Li-Fi signaling devices. These dual Li-Fi signaling devices provide bi-directional signaling; from the aircraft's flight controller to the hub's electronic control unit 104 and from the hub's electronic control unit 104 to the aircraft's flight controller.

An electromagnet 216 is positioned symmetrically with electromagnet 207. Electromagnet 216 places its South pole adjacent to the narrow air gap that separates it from the outer surface of a receiver coil like coil 112. Electromagnet 216 is attached to a magnet support strut 217 shown as a dashed outline rectangle, which attaches said electromagnet 216 to the forward external surface of said propmotor 135. One of the two limit switches 222 is shown as a small rectangle at the forward edge of the hollow cavity in the hub case. An identical limit switch is located on the aft edge of the hollow cavity, axisymmetric to the thrust axis.

Figure 3:
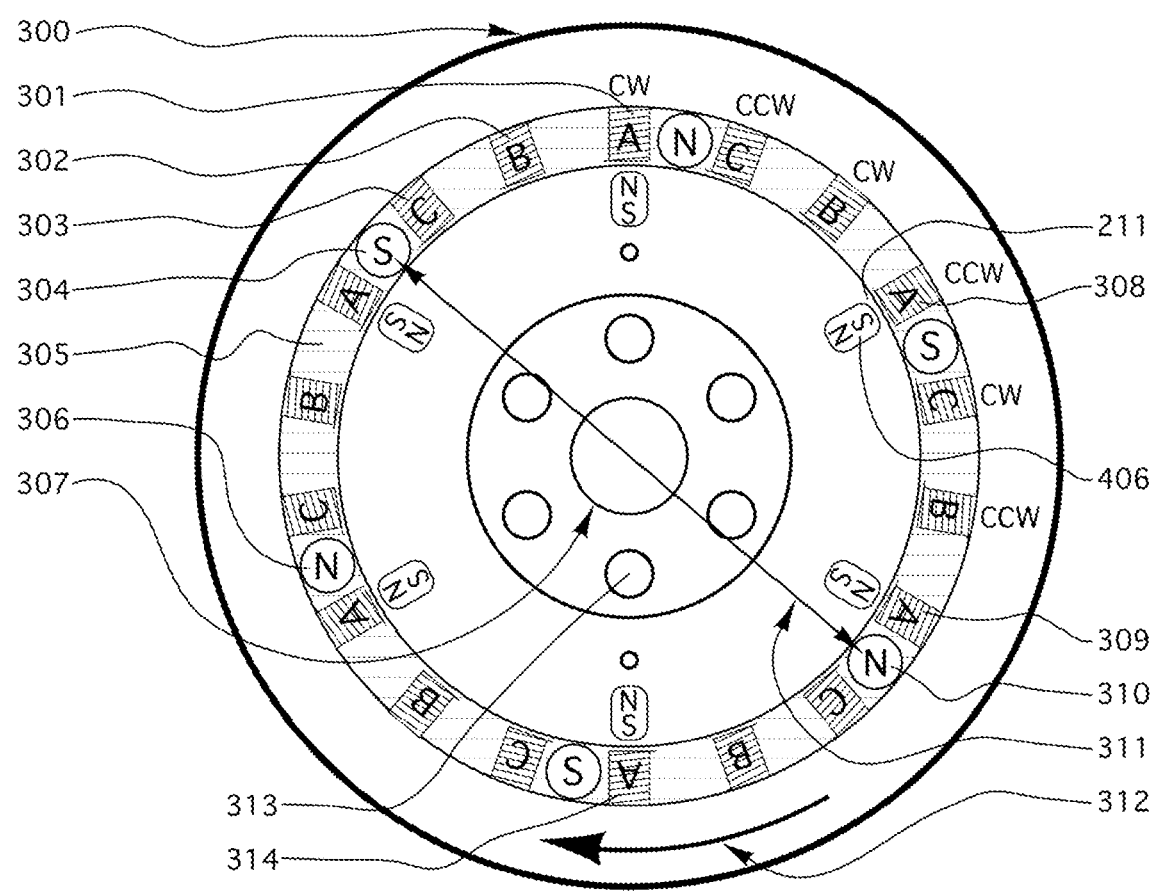
FIG. 3 depicts a schematic frontal view of a hub with a central propeller mounting flange, a nominal annulus of receiver coils and an annulus of six round magnets that interface across an air gap from the aft surface of said receiver coils.

FIG. 3 depicts a schematic axial view of the rear surface of a propeller hub with a central propeller mounting flange, a nominal axisymmetric annulus of 18 receiver coils 305 and two stationary axisymmetric annuli of magnets, each with 6 permanent magnets. Said annuli of permanent magnets are of two different radii. The annulus of permanent magnets with the larger radius interfaces across a narrow air gap (not shown in FIG. 3 but shown as air gap 127 in FIG. 1) alongside the aft surface of said annulus 305 of receiver coils. The annulus of permanent magnets with the smaller radius interfaces across a narrow air gap 211 along the inner surface of said annulus 305 of receiver coils. The size, spacing and number of all components in FIG. 3 is schematic of one particular embodiment of several possible configurations. The embodiment of the propeller hub shown in FIG. 3 is one arranged to have a fixed annulus of magnets induct a three-phase alternating voltage into the annulus 305 of receiver coils when said annulus of receiver coils rotates clockwise around the thrust axis of said propeller hub. Each of the 18 receiver coils in FIG. 3 is wired so as to belong one of three different "families", which families are labeled in FIG. 3 as family "A", family "B" and family "C". Although not shown in FIG. 3, for sake of simplicity, the receiver coils of each family A, B or C are wired with either a clockwise (CW) winding of its coil wire or a counterclockwise (CCW) winding of its coil wire. The first receiver coil A 301 located at the twelve o'clock position in FIG. 3 is wound clockwise CW. Proceeding clockwise around the annulus 305 to near the two o'clock position, the next receiver coil A 308 is wound counterclockwise CCW. Proceeding further clockwise around the annulus 305 to near the four o'clock position, the next receiver coil A 309 is wound clockwise CW. This sequence of coils that are alternating being wound clockwise followed by one that is wound counterclockwise and then by one that is wound clockwise proceeds around the circle of the annulus 305 of receiver coils on the propeller hub such that each successive receiver coil of a given family is wound oppositely from the preceding one.

The coil wires of each clockwise successive receiver coil in a family are connected in series, which is described for family "A" as follows: The wire that comprises the coil winding of a first receiver coil of family "A" 301, which is located at the twelve o'clock position along said annulus 305, continues on in a clockwise direction around the annulus 305 from said first receiver coil A 301 to connect to and become the coil wire of the next clockwise succeeding receiver coil of family "A", namely A 308, which is located near the two o-clock position along said annulus 305. Said coil wire comprising the coil winding of said second receiver coil A 308 then continues on clockwise around the annulus 305 to connect to and become the coil wire of the next clockwise succeeding receiver coil of family "A", namely A 309, the third receiver coil, located at the four o'clock position along said annulus 305. This sequence, wherein as one proceeds clockwise around the annulus 305, each clockwise succeeding receiver coil in a family provides the input wire to the next clockwise succeeding receiver coil continues clockwise until it reaches the final receiver coil in the family "A" at about ten o'clock on the annulus 305. The coil wire that exits from said final receiver coil of family "A" continues on to become the "Phase output wire" known as "Phase A output wire" of the family "A" of receiver coils. A clockwise succession of receiver coils of family "B" along said annulus 305 are likewise wired in series, ending with the output wire known as "Phase B output wire" of the family "B" of receiver coils. A clockwise succession of receiver coils of family "C" along said annulus 305 are likewise wired in series, ending with the output wire known as "Phase C output wire" of the family "C" of receiver coils. All receiver coils of all families are disposed axisymmetrically around said annulus 305 and are spaced at equal intervals clockwise around said annulus 305, wherein a family "A" receiver coil is followed clockwise by a family "B" receiver coil which, in turn, is followed clockwise by a family "C" receiver coil, as shown in FIG. 3.

Figure 7:
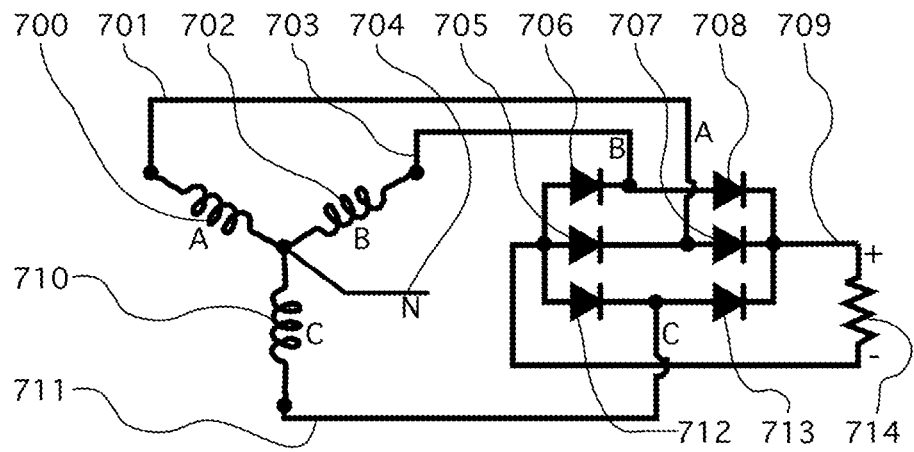
FIG. 7 depicts a three-phase schematic electrical circuit that represents the three families of receiver coils (A, B and C) and their connection through a full-wave bridge rectifier to the ECU.

A wire has two ends. For each family of receiver coils there is one end that is a Phase output wire and there is at the opposite end of the wire that weaves through said family of receiver coils a wire end that is the "neutral" or "N" wire end of said family. The neutral wires from each of the three families of receiver coils are connected together to form a single common N wire. Emerging from the annulus 305 of receiver coils, there are thus four wires: a Phase A output wire end, a Phase B output wire end, a Phase C output wire end and a single common neutral or "N" wire end 704 that is comprised of the merged connection of the neutral wires from each of the three families. For simplicity, these four wires are not depicted in FIG. 3 but are shown in FIG. 7.

In FIG. 3, the outer surface of the propeller spinner's circular base 300 is indicated by an arrow. The receiver coil 301 of family "A" along the annulus 305 of receiver coils is depicted at the twelve o'clock position. Said receiver coil 301 has an adjacent "CW" label to indicate that its coil is wound clockwise. The receiver coil 302 of family "B" along the annulus 305 of receiver coils is depicted at a location that is 20° counterclockwise from receiver coil 301. The receiver coil 303 of family "C" along the annulus 305 of receiver coils is depicted at a location that is 20° counterclockwise from receiver coil 302. The circular disc-shaped permanent magnet 304 is one of six permanent magnets that are each attached at 60° intervals from each other along a fixed annulus of magnets wherein said stationary annulus (not shown) is axisymmetric with the propeller's thrust axis and is of the same radius as annulus 305 of receiver coils, Said magnet 304 is depicted with an "S" label to indicate that its South pole is facing the receiver coils on annulus 305. Said fixed annulus of magnets is positioned across a narrow air gap 409 from annulus 305. The polarity, North or South, of the forward face of each of the six circular permanent magnets along said fixed annulus of magnets can be seen to alternate as either North or South. Accordingly, permanent magnet 306, which is 60° counterclockwise from magnet 304, is shown to have a North polarity. A circle depicts the outer surface of the coaxial recess 307 that is in the aft surface of the propeller mounting flange of said propeller hub. The receiver coil 308 of the family "A" is depicted with an adjacent label of CCW to indicate that it has counterclockwise winding of its coil. Said coil 308 is the second of six coils in family "A" and is located 60° clockwise along annulus 305 from receiver coil 301. A cylindrical permanent magnet 406 is one of six such cylindrical permanent magnets that are each attached at 60° intervals from each other along a stationary annulus of cylindrical magnets wherein said stationary annulus (not shown) is axisymmetric with the propeller's thrust axis and is of a slightly smaller radius than annulus 305 of receiver coils. The South pole of said magnet 406 is positioned across a narrow air gap 211 from the inner surface of receiver coil 308 of family "A". At this particular rotational position of annulus 305, it can be seen that each of the other cylindrical magnets on said smaller radius stationary annulus is positioned so that it likewise aligns across said air gap 211 from the inner surface of a receiver coil of family "A". It will also be noted that the polarity of the outer face of each successive cylindrical magnet along said smaller radius stationary annulus alternates as being either North polarity or South polarity. In FIG. 3, the narrow air gap 211 between a cylindrical magnet and a receiver coil of family "A" is analogous to more general annular narrow air gap 409 in FIG. 4. A double arrow 311 indicates that a circular permanent magnet 310 with its North pole facing towards the aft surface of annulus 305 is exactly 180° opposite the position of circular permanent magnet 304 that has its South pole facing towards the aft surface of annulus 305. Arrow 312 indicates clockwise rotation as the nominal direction of rotation of the annulus 305 when the propeller hub rotates. Propeller bolt hole 313 is one of six such holes in the propeller hub's propeller mounting flange. Receiver coil 314 of family "A" is depicted as being located 180° opposite receiver coil 301 and as having the adjacent cylindrical magnet's polarity be South instead of the North polarity seen at receiver coil 301.

Figure 4:
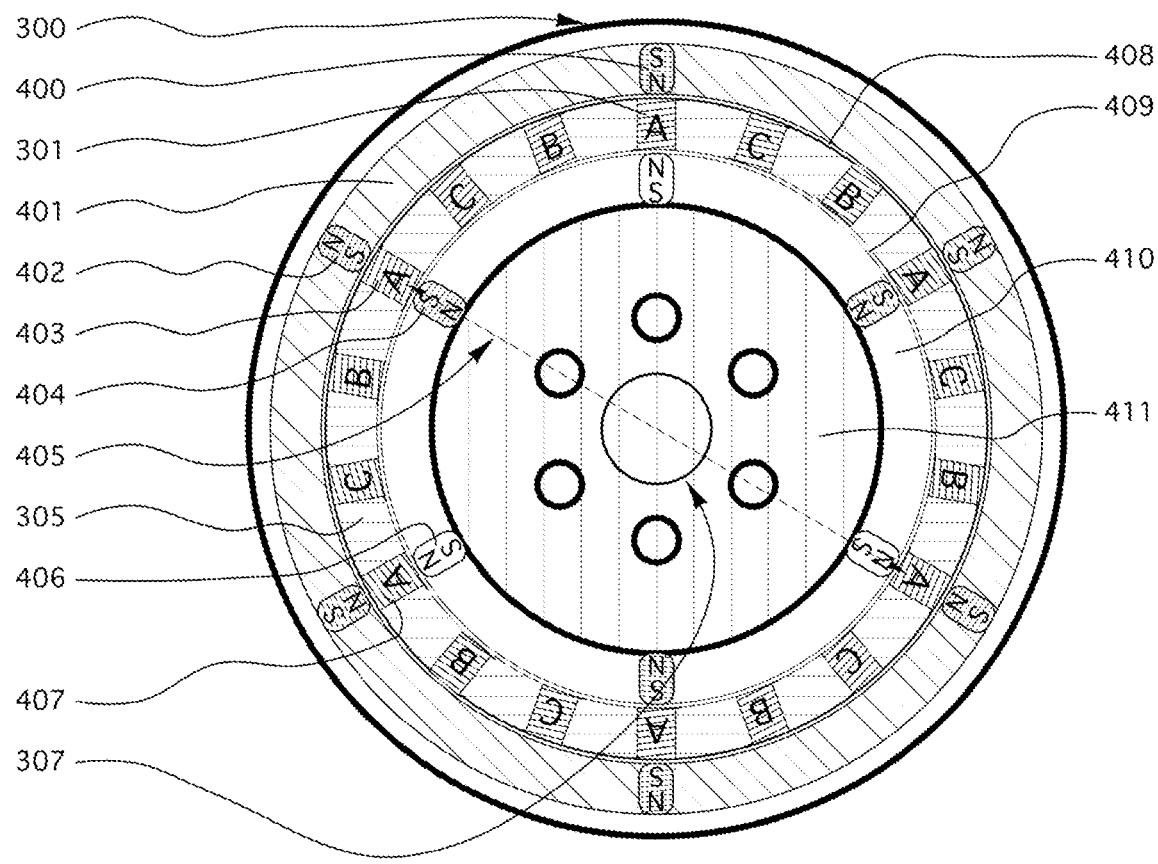
FIG. 4 depicts a schematic frontal view of a hub with a central propeller mounting flange, a nominal annulus of receiver coils and two stationary annuli of magnets whose interfaces are across air gaps on the inner surface and outer surface of said receiver coils, respectively.

FIG. 4 depicts a schematic axial view of the rear surface of a propeller hub with a central propeller mounting flange, a nominal axisymmetric rotating annulus 305 of 18 receiver coils similar to receiver coil 301, an outer stationary annulus 401 comprising six electromagnets including 400, 402, etc., and an inner fixed hybrid annulus 410 comprising six magnets that comprise 3 permanent magnets 406, each alternating clockwise around said annulus 410 with an electromagnet 404. Magnet 404 has its South pole oriented toward the inner surface of its adjacent receiver coil 403, while magnet 406 has its North pole oriented toward the inner surface of its adjacent receiver coil 407, respectively. This feature of alternation of a North pole then a South pole orientation for each succeeding magnet counterclockwise around each of said stationary annuli of magnets is a preferred embodiment but does not exclude other embodiments. Said stationary annuli of magnets are of two different radii and both annuli are axisymmetric with the thrust axis of the propeller hub. As one proceeds counterclockwise around the outer stationary annulus 401 of electromagnets, beginning with electromagnet 400 at the twelve o'clock position, the North-South polarity orientation of each of its six electromagnets are seen to alternate, as follows: Electromagnet 400 at the twelve o'clock position has its North pole facing inward toward the outer surface of receiver coil 301 on annulus 305 of receiver coils, electromagnet 402 has its South pole facing inward toward receiver coil 403 on the annulus 305 of receiver coils, and such alternation of polarity continues with each successive electromagnet of family "A" counterclockwise around said stationary annulus 401. As noted in FIG. 3, receiver coil 301 of family "A" has its coil wound in a clockwise CW direction. In FIG. 4, receiver coil 301 with CW winding is followed counterclockwise around said annulus 305 by the next receiver coil 403 of family "A", whose coil is wound in a counterclockwise CCW direction. Such alternation in the CW and CCW winding of the successive receiver coils located along annulus 305 proceeds counterclockwise in FIG. 4 as it does in FIG. 3, such that each succeeding receiver coil is wound with a winding direction opposite to that receiver coil that precedes it on the annulus 305. Electromagnets 402 and 404 are positioned so that their South pole is oriented toward the narrow air gaps on the outer surface 408 and inner surface 409, respectively, of receiver coil 403 of family "A". Said South pole orientation is contrasted with North pole orientation for receiver coil 301 of family "A" at the twelve o'clock position of annulus 305, where the electromagnet 400 on the outer stationary annulus 401 is shown to have its North pole oriented toward coil 301 and where the permanent magnet at the twelve o'clock position on the inner fixed hybrid annulus 410 likewise has its North pole oriented toward coil 301. Double arrow 405 indicates that the receiver coils of family "A" that are 180° apart on annulus 305 are in every case faced with magnets, both inner and outer, of opposite poles. Correspondingly, all receiver coils that are 180° apart on annulus 305 are of the same family and in every case, they have their coils wound in opposite directions (CW or CCW). Some embodiments of this invention will use only an outer fixed annulus of magnets, which may be all permanent magnets, all electromagnets or a hybrid mix of alternating permanent and electromagnets. Some embodiments of this invention will use only an inner fixed annulus of magnets, which may be all permanent magnets, all electromagnets or a hybrid mix of alternating permanent and electromagnets. Some embodiments of this invention will use only a fixed annulus of magnets that is closely apposed to the aft surface of the annulus of receiver coils, and which is comprised of all permanent magnets, all electromagnets or a hybrid mix of alternating permanent and electromagnets. Some embodiments of this invention will use a combination of said inner, outer and aft-surface aligned fixed annulus of magnets. Some embodiments of this invention will use more than one annuli of receiver coils. All of the annuli used in this invention will have radii that confine them to fit inside the largest diameter of said propeller hub, and those radii may vary to suit the application or size of hub. The propeller hub's propeller mounting flange 411 is shown in coarse diagonal crosshatch with its six equally spaced propeller bolt holes.

Figure 5:
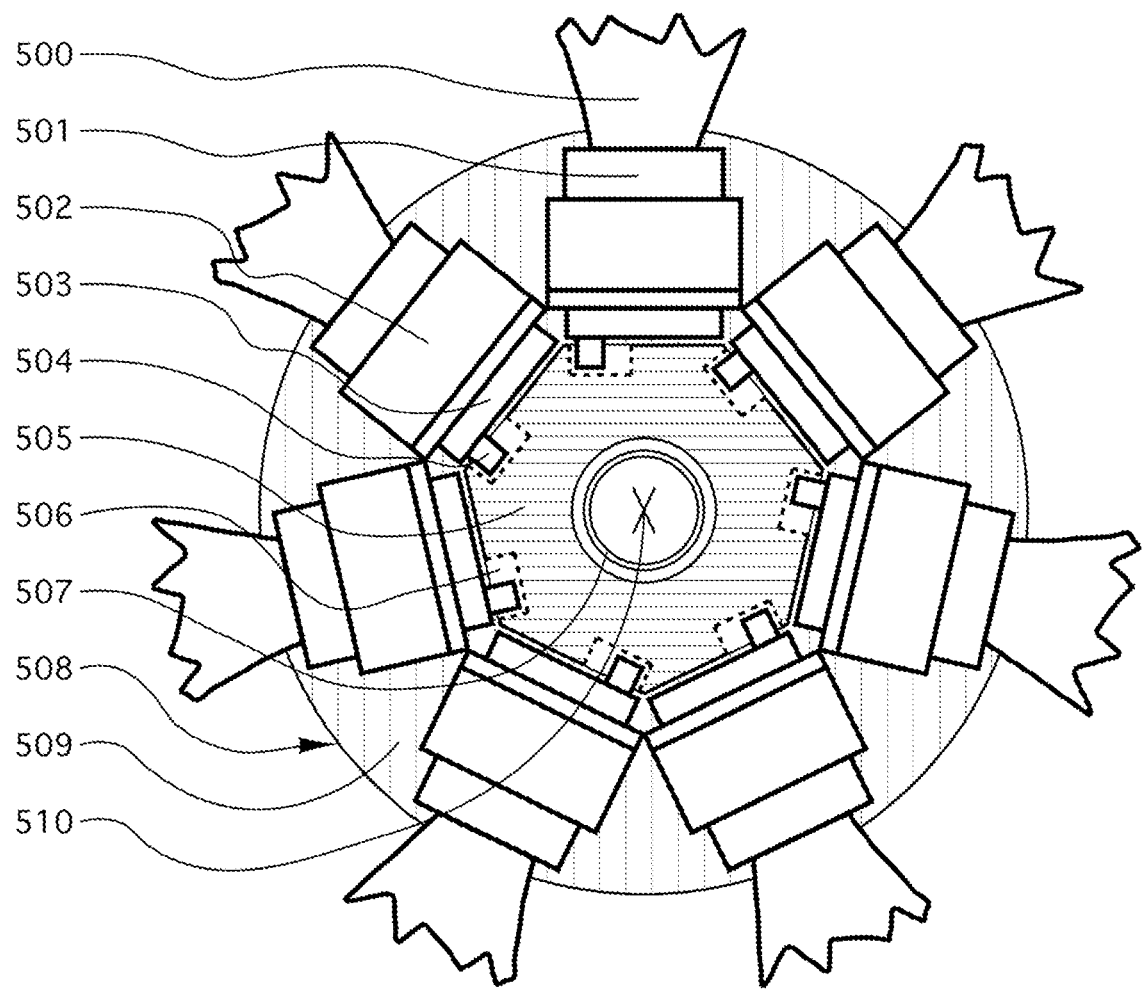
FIG. 5 depicts a 7-bladed propeller hub with a central slot-block that the internal reversable hub motor moves fore and aft in order to move the blade nub bearing on the end of each propeller shank in order to change that blade's pitch.

FIG. 5 depicts the non-electrical internal components of the propeller hub that enable the changing of each propeller blade's pitch angle. A truncated view of a propeller blade's root 500 is shown at the twelve o'clock position in FIG. 5. A blade retention ferrule 501 connects each blade into its respective hole in the propeller hub. A blade retention bearing 502 holds the shank of each blade and allows said shank to rotate during pitch changes. A circular knob 503 on the innermost portion of the blade shank bears the pull-out loads on each blade. The pitch change propeller blade nub bearing 504 is eccentrically located on the periphery of the bottom of each blade shank. Said nub bearing 504 moves inside a slot 506 that is in the slot-block 505 that is moved fore and aft in order to execute pitch changes to each blade. It will be noted that there is a slot 506 and nub bearing 504 for each of the seven propeller blades and these are axially symmetric to the thrust axis of the propeller. The outer surface of the propeller spinner 508 is shown by an arrow and the spinner backing plate 509 is depicted in coarse vertical crosshatch. The central axial jackscrew thread 507 that moves the slot-block 505 is driven by the internal hubmotor. The thrust axis 510 of the propeller hub is at the center of the hub.

Figure 6:
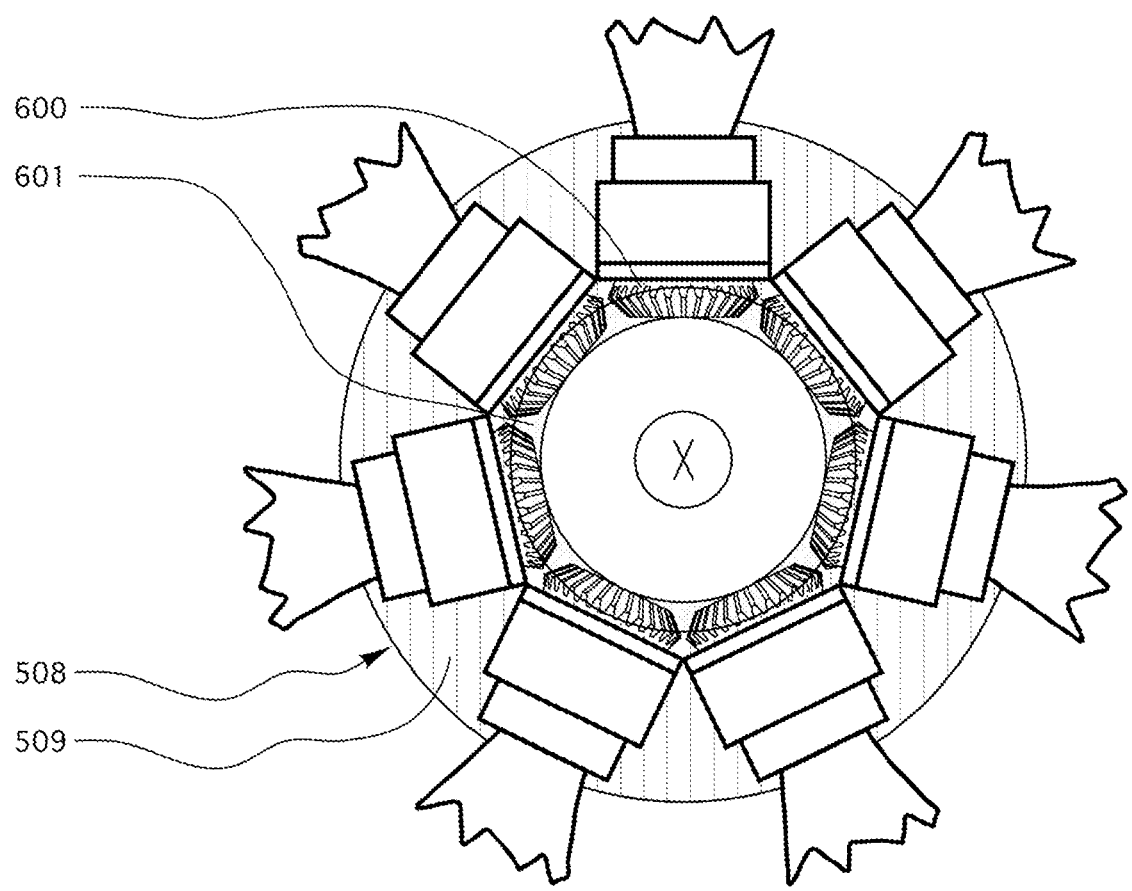
FIG. 6 depicts a 7-bladed propeller hub with a large central bevel-gear that rotates in order to move the small bevel gears that are blade gears on the inner end of each propeller blade's shank in order to change each blade's pitch.

FIG. 6 depicts a 7-bladed propeller hub with a large internal axial bevel-gear 601 that is a motor gear that is reversibly rotated by the internal reversible hubmotor in order to move the smaller bevel gear 600 on the end of each propeller blade shank in order to change that blade's pitch. The outer surface of the propeller spinner 508 is shown by an arrow and the spinner backing plate 509 is depicted in coarse vertical crosshatch. The inner portions of the seven propeller blades and their hub interfaces are the same as those depicted in FIG. 5.

FIG. 7 depicts a three-phase schematic electrical circuit that represents the three families of receiver coils, A, B and C, and their respective connections through a full-wave bridge rectifier to said propeller hub's electronic control unit (ECU). Receiver coil of family "A" 700 gives off Phase A output wire 701 which wire connects between diode 705 and diode 707 of the full-wave rectifier's six diodes. Receiver coil of family "B" 702 gives off Phase B output wire 703 which wire connects between diode 706 and diode 708 of the full-wave rectifier's six diodes. Receiver coil of family "C" 710 gives off Phase C output wire 711 which wire connects between diode 712 and diode 713 of the full-wave rectifier's six diodes. The output wire 709 of said full-wave rectifier conducts the positive voltage that emerges from said full-wave rectifier to supply positive voltage to the electrical load 714 that represents the ECU inside said propeller hub.

Figure 8:
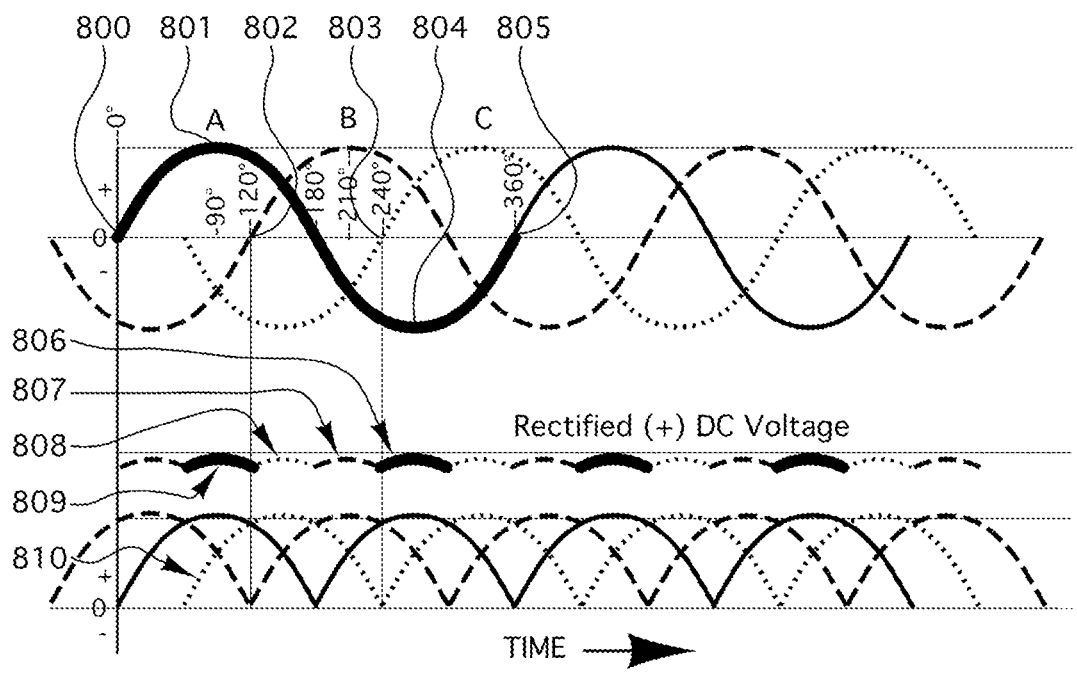
FIG. 8 depicts the wave forms of the succession of voltages that are inducted into receiver coil families A, B and C, their phases and their rectified sum as a positive voltage.

FIG. 8. graphically depicts the timing and amplitudes of the succession of voltages that are inducted into receiver coil families A, B and C, showing their phases and their rectified sum. When the propeller hub rotates, the amplitudes of the alternating voltages that are induced into its receiver coils by the stationary annuli of permanent magnets, vary with time according to a sine-wave function, as shown in FIG. 8. A heavy solid line denotes the sine-wave of the family "A" of receiver coils as a waveform that represents the periodic oscillation of voltage amplitudes, starting at zero voltage at its origin 800 at 0°, and plotted along the "X" axis or abscissa representing time. Said amplitudes conform to the shape that is a plot of the sine function of each angle between 0° and 360°. The peak in this sine-wave's voltage amplitude 801 represents the maximum positive voltage that is inducted into family "A" of receiver coils. The induced voltages comprise repeating cycles of changing amplitudes over time that smoothly oscillate between a peak positive amplitude (e.g. 801) and a peak negative amplitude (e.g. 804). The heavy solid line that includes origin 800 and peak 801 depicts one complete cycle of said oscillation. It shows an oscillation of inducted voltage from zero amplitude at its origin 800 to peak positive amplitude 801 then back down to zero amplitude then down to a peak negative amplitude 804 and then returning up to zero amplitude 805 at 360°. In the present invention, a plot of the voltage amplitude versus time for each of the Phase output wires from each family of receiver coils during rotation of the propeller hub has the same sine-wave shape. However, when said propeller hub is rotating, the peak positive voltage amplitude in the Phase output wire of each of the three families of receiver coils occurs at a different time, and, with the present spacing of receiver coils along the annulus 305, the interval of time between said peaks comprises 120° of a 360° cycle. Accordingly, said voltage sine-waves of the three Phase output wires (A, B and C) are said to be 120° "out of phase". In FIG. 8, the heavy solid line showing the peak in voltage amplitude 801 at 90° is reached after a rise of voltage into positive values from origin 800 at 0° on the abscissa or "X" axis of time, while the thin dashed line that represents the sine-wave 802 of alternating voltage in Phase B output wire is shown to have its rise into positive values originate at 120°, and the thin dotted line that represents the sine-wave 803 of alternating voltage in Phase C output wire has its rise into positive values originate at 240°, which is 120° after the origin of the sine-wave 802. The voltage oscillations in Phase output wires A, B, and C are thus seen to be out of phase by 120°. A full-wave rectifier is able to convert said sine-waves of oscillating positive and negative voltages in Phase output wires A, B, and C into exclusively positive voltages. Said full-wave rectifier effectively clips the peak positive and peak negative voltages from each of said wires, and strings them together into a continuous positive voltage whose amplitude is greater than any of the sine-wave peak voltage amplitudes from which they are derived. The peak negative voltage 804 shown in the heavy solid line depicting the sine-wave voltage of Phase A output wire is converted by said full-wave rectifier into a clipped peak positive voltage shown by the correspondingly-timed heavy solid line arc 806. Similarly, the peak positive voltage at 210° of Phase B output wire shown as a dashed line sine-wave 802 is clipped by said full-wave rectifier to become a peak positive voltage shown by the correspondingly-timed dashed line arc 807. Similarly, the peak negative voltage at 150° of Phase C output wire shown as a dotted line sine-wave 803 is clipped by said full-wave rectifier to be inverted to become a peak positive voltage shown by the correspondingly-timed dotted line arc 808. Dotted line arc 808 represents the top portion of dotted line arc 810 of the rectified voltages from receiver coil family C, shown just below it in FIG. 8. Dotted line arc 810 can be seen to be concurrent with and represents the rectifier-inverted contour of the negative voltage peak in the dotted line that represents the voltages in Phase C output wire. Similarly, the peak positive voltage at 90° of Phase A output wire shown as a heavy solid line sine-wave 801 is clipped by said full-wave rectifier to become a peak positive voltage shown by the correspondingly-timed dotted line arc 809. In the lower portion of FIG. 8, it can be seen that the triad of line arcs 806, 807 and 808, strung together by said full-wave rectifier, comprise a continuous recurring sequence of peak positive voltages that comprise a sustained positive voltage that can be used by the propeller hub's ECU to operate said hub.

What is claimed is:

1. An electric, inductively-energized, multi-bladed, controllable-pitch propeller hub system comprising:
    a controllable-pitch propeller hub comprising a hub case;
        said hub case comprising:
            a neck-shaft with a propeller mounting flange configured to couple with a driveshaft to rotate the hub case;
            a hub battery;
            a reversible hubmotor that is mechanically coupled with each of a plurality of propeller blades to adjust a blade pitch;
            a hub electronic control unit electrically coupled with the reversible hubmotor to control the pitch of the propeller blades; and
            an alternator that produces electrical energy and comprises an annulus of receiver coils that is coupled to and rotates with said propeller hub;
                wherein each of the receiver coils comprises multiple windings of a conductive wire; and
                wherein said conductive wire is coupled with said hub electronic control unit; and
                wherein said annulus of receiver coils is axisymmetrically distributed around the hub case and configured to rotate across an air gap from a magnet arrangement of fixed magnets, having a magnetic field, to produce electrical energy through induction of electrical voltage into the receiver coil when said hub case rotates;

wherein the fixed magnets comprise electromagnets;
wherein all electrical energy required for said controllable-pitch propeller hub is electrically inducted into said receiver coils within said controllable-pitch propeller hub;
wherein the hubmotor is a servomotor that changes blade pitch position from a first blade pitch position to a second blade pitch position within two seconds;
wherein said annulus of receiver coils comprises receiver coils that are each configured to form a plurality of exposed surfaces including an inner surface, an outer surface and an aft surface and wherein, during rotation of the hub, the magnet arrangement of fixed magnets extend across an air gap from at least one of the exposed surfaces of said receiver coils;
wherein the air gap is no more than 2 mm;
wherein the electronic control unit controls charging of the battery with electrical energy produced by the alternator;
wherein the electronic control unit comprises a signal receiver that is configured to receives command signals from an aircraft flight controller to control the blade pitch of the plurality of propeller blades by actuating the reversible hubmotor;
wherein the command signals from the aircraft flight controller are wireless command signals and wherein the electronic control unit further comprises a wireless signal transceiver to receive and respond to said wireless command signals;
wherein the electronic control unit monitors a state of charge of the hub battery and wirelessly transmits said state of charge to the aircraft flight controller;
wherein the controllable-pitch propeller hub further comprises a limit switch that is coupled with the electronic control unit that prevents the plurality of propeller blades from operating at a blade pitch position that is either beyond a lower threshold limit or beyond an upper threshold limit of safe operation;
wherein the limit switch comprises a blade pitch sensor that detects, monitors, reports and limits the blade pitch position of at least one of the plurality of propeller blades;
wherein the hub comprises said driveshaft and wherein the outer surface of said driveshaft has a male spline that is configured to insert into and interdigitate with a matching female spline on a hollow central shaft of a propmotor; and
wherein said female spline on said hollow central shaft of said propmotor is configured to apply a torque to said male spline in order to rotate said propeller hub; and
wherein said driveshaft is configured to couple with a central hollow rotor shaft having an internal surface with female splines configured to couple with the male spline of said driveshaft.

2. The electric, inductively-energized, multi-bladed, controllable-pitch propeller hub system of claim 1, wherein the reversible hubmotor is coupled with a hubmotor gearshaft that rotates a motor gear wherein each of the plurality of propellers blades has a propeller blade gear that is engaged with the motor gear, and wherein the reversible hubmotor simultaneously and equally rotates each of said plurality of propeller blades, wherein rotational axis of the hubmotor gearshaft is coaxial with the thrust axis of the propeller and wherein the blade gears are configured around the hubmotor gearshaft and have rotational axes that are orthogonal to the hubmotor gearshaft.

3. The electric, inductively-energized, multi-bladed, controllable-pitch propeller hub system of claim 1, wherein the air gap is no more than 2 mm.

4. The electric, inductively-energized, multi-bladed, controllable-pitch propeller hub system of claim 1, wherein the hub comprises said driveshaft and wherein the outer surface of said driveshaft has a male spline that is configured to insert into and interdigitate with a matching female spline on a hollow central shaft of a propmotor; and
wherein said female spline on said hollow central shaft of said propmotor is configured to apply a torque to said male spline in order to rotate said propeller hub; and
wherein said driveshaft is configured to couple with a central hollow rotor shaft having an internal surface with female splines configured to couple with the male spline of said driveshaft.

5. The electric, inductively-energized, multi-bladed, controllable-pitch propeller hub system of claim 1, wherein said driveshaft has a proximal thrust bearing flange that bears upon a proximal thrust bearing surface on said propmotor; and
wherein said driveshaft has a terminus on its distal end, opposite from the proximal end, comprising a receptacle with female threads to which attaches a metal endcap wherein said metal endcap comprises:
a distal thrust bearing flange with a first shoulder on which are stacked thrust bearing washers; and
a second indexing shoulder that centers said metal endcap's attachment to said terminus; and
a male-threaded fastener that securely attaches said metal endcap to said female threads in said receptacle on said terminus; and
wherein said metal endcap attaches said driveshaft to said promotor; and
wherein the thickness of the stack of thrust bearing washers stacked onto said first shoulder of said driveshaft sets the dimensions of both the proximal and distal axial thrust clearances of said driveshaft and the dimensions of said air gap between said receiver coils and said fixed magnets; and
a power-take-off drive gear on the outer surface of said metal endcap.

6. An electric, inductively-energized, multi-bladed, controllable-pitch propeller hub system comprising:
a controllable-pitch propeller hub comprising a hub case;
said hub case comprising:
a neck-shaft with a propeller mounting flange configured to couple with a driveshaft to rotate the hub case;
a hub battery;
a reversible hubmotor that is mechanically coupled with each of a plurality of propeller blades to adjust a blade pitch;
a hub electronic control unit electrically coupled with the reversible hubmotor to control the pitch of the propeller blades; and
an alternator that produces electrical energy and comprises an annulus of receiver coils that is coupled to and rotates with said propeller hub;
wherein each of the receiver coils comprises multiple windings of a conductive wire; and
wherein said conductive wire is coupled with said hub electronic control unit; and wherein said annulus of receiver coils is axisymmetrically distributed around the hub case and configured to rotate across an air gap from a magnet arrangement of fixed magnets, having a magnetic field, to produce electrical energy through induction of electrical voltage into the receiver coil when said hub case rotates;

wherein all electrical energy required for said controllable-pitch propeller hub is electrically inducted into said receiver coils within said controllable-pitch propeller hub;

wherein the hub comprises said driveshaft and wherein the outer surface of said driveshaft has a male spline that is configured to insert into and interdigitate with a matching female spline on a hollow central shaft of a propmotor; and wherein said female spline on said hollow central shaft of said propmotor is configured to apply a torque to said male spline in order to rotate said propeller hub; and wherein said driveshaft is configured to couple with a central hollow rotor shaft having an internal surface with female splines configured to couple with the male spline of said driveshaft;

wherein said driveshaft has a proximal thrust bearing flange that bears upon a proximal thrust bearing surface on said propmotor; and wherein said driveshaft has a terminus on its distal end, opposite from the proximal end, comprising a receptacle with female threads to which attaches a metal endcap wherein said metal endcap comprises:

a distal thrust bearing flange with a first shoulder on which are stacked thrust bearing washers; and a second indexing shoulder that centers said metal endcap's attachment to said terminus; and a male-threaded fastener that securely attaches said metal endcap to said female threads in said receptacle on said terminus; and wherein said metal endcap attaches said driveshaft to said promotor; and wherein the thickness of the stack of thrust bearing washers stacked onto said first shoulder of said driveshaft sets the dimensions of both the proximal and distal axial thrust clearances of said driveshaft and the dimensions of said air gap between said receiver coils and said fixed magnets; and a power-take-off drive gear on the outer surface of said metal endcap.

7. An electric, inductively-energized, multi-bladed, controllable-pitch propeller hub system comprising:

a controllable-pitch propeller hub comprising a hub case; said hub case comprising:

a neck-shaft with a propeller mounting flange configured to couple with a driveshaft to rotate the hub case;

a hub battery;

a reversible hubmotor that is mechanically coupled with each of a plurality of propeller blades to adjust a blade pitch;

a hub electronic control unit electrically coupled with the reversible hubmotor to control the pitch of the propeller blades; and an alternator that produces electrical energy and comprises an annulus of receiver coils that is coupled to and rotates with said propeller hub;

wherein each of the receiver coils comprises multiple windings of a conductive wire; and wherein said conductive wire is coupled with said hub electronic control unit; and wherein said annulus of receiver coils is axisymmetrically distributed co axially around the hub case and configured to rotate across an air gap from a magnet arrangement of fixed magnets, having a magnetic field, to produce electrical energy through induction of electrical voltage into the receiver coil when said hub case rotates;

wherein the fixed magnets comprise electromagnets;

wherein all electrical energy required for said controllable-pitch propeller hub is electrically inducted into said receiver coils within said controllable-pitch propeller hub;

an encoded command signal system wherein the aircraft flight controller modulates a frequency and amplitude of electricity supplied to the fixed electromagnets that thereby inducts a succession of voltages of modulated frequency and amplitude across said air gap into said annulus of receiver coils; and wherein said succession of voltages comprises encoded command signals from the aircraft flight controller that are conducted from the receiver coils into the electronic control unit that receives, decodes, interprets and acts upon said encoded command signals in order to actuate the reversible hubmotor to change the blade pitch position of the plurality of propeller blades as commanded by said signals.

8. The electric, inductively-energized, multi-bladed, controllable-pitch propeller hub system of claim 7, wherein the hub comprises said driveshaft and wherein the outer surface of said driveshaft has a male spline that is configured to insert into and interdigitate with a matching female spline on a hollow central shaft of a propmotor; and wherein said female spline on said hollow central shaft of said propmotor is configured to apply a torque to said male spline in order to rotate said propeller hub; and wherein said driveshaft is configured to couple with a central hollow rotor shaft having an internal surface with female splines configured to couple with the male spline of said driveshaft.

9. The electric, inductively-energized, multi-bladed, controllable-pitch propeller hub system of claim 8, wherein said driveshaft has a proximal thrust bearing flange that bears upon a proximal thrust bearing surface on said propmotor; and wherein said driveshaft has a terminus on its distal end, opposite from the proximal end, comprising a receptacle with female threads to which attaches a metal endcap wherein said metal endcap comprises:

a distal thrust bearing flange with a first shoulder on which are stacked thrust bearing washers; and a second indexing shoulder that centers said metal endcap's attachment to said terminus; and a male-threaded fastener that securely attaches said metal endcap to said female threads in said receptacle on said terminus; and wherein said metal endcap attaches said driveshaft to said promotor; and wherein the thickness of the stack of thrust bearing washers stacked onto said first shoulder of said driveshaft sets the dimensions of both the proximal and distal axial thrust clearances of said driveshaft and the dimensions of said air gap between said receiver coils and said fixed magnets; and a power-take-off drive gear on the outer surface of said metal endcap.

10. The electric, inductively-energized, multi-bladed, controllable-pitch propeller hub system of claim 7, wherein the alternator operates with a resonant inductive coupling and wherein a receiver coil and an electromagnet are each paired with a capacitor to create said resonant inductive coupling that is configured to wirelessly induct voltages into said receiver coil across an air gap equal to or greater than 2.0 mm.

11. The electric, inductively-energized, multi-bladed, controllable-pitch propeller hub system of claim 10, wherein the hub comprises said driveshaft and wherein the outer surface of said driveshaft has a male spline that is configured to insert into and interdigitate with a matching female spline on a hollow central shaft of a propmotor; and wherein said female spline on said hollow central shaft of said propmotor is configured to apply a torque to said male spline in order to rotate said propeller hub; and wherein said driveshaft is configured to couple with a central hollow rotor shaft having an internal surface with female splines configured to couple with the male spline of said driveshaft.

12. The electric, inductively-energized, multi-bladed, controllable-pitch propeller hub system of claim 11, wherein said driveshaft has a proximal thrust bearing flange that bears upon a proximal thrust bearing surface on said propmotor; and wherein said driveshaft has a terminus on its distal end, opposite from the proximal end, comprising a receptacle with female threads to which attaches a metal endcap wherein said metal endcap comprises:

a distal thrust bearing flange with a first shoulder on which are stacked thrust bearing washers; and a second indexing shoulder that centers said metal endcap's attachment to said terminus; and a male-threaded fastener that securely attaches said metal endcap to said female threads in said receptacle on said terminus; and wherein said metal endcap attaches said driveshaft to said promotor; and wherein the thickness of the stack of thrust bearing washers stacked onto said first shoulder of said driveshaft sets the dimensions of both the proximal and distal axial thrust clearances of said driveshaft and the dimensions of said air gap between said receiver coils and said fixed magnets; and a power-take-off drive gear on the outer surface of said metal endcap.

13. The electric, inductively-energized, multi-bladed, controllable-pitch propeller hub system of claim 11, further comprising:

a fixed hybrid annulus of magnets that comprises a plurality of both permanent magnets and said electromagnets that are each attached to one or more fixed annuli that are attached to the proximal external surface of said propmotor so as to be both adjacent to said propeller hub's external surface and axisymmetric to its thrust axis; and wherein said fixed permanent magnets and said fixed electromagnets are attached sequentially along the circumference of said fixed hybrid annulus of magnets wherein a first permanent magnet is followed by a first electromagnet that is followed by a second permanent magnet that is followed by a second electromagnet and so forth alternating the type of magnet around the entire said circumference; and wherein, the interval distance around said circumference between a permanent magnet and an electromagnet is a fixed interval distance and said fixed interval distance separates all magnets along the entire circumference of the hybrid fixed annulus of magnets; and wherein, during rotational operation of said propeller hub, a receiver coil passing the air gap from any magnet on the hybrid fixed annulus of magnets has inducted into said receiver coil a succession of voltages whose frequency and amplitude depend upon whether said voltage is inducted by the passing of a permanent magnet or by the passing of an electromagnet.

\* \* \* \* \*